United States Patent [19]
Kokado et al.

[11] Patent Number: 4,956,833
[45] Date of Patent: Sep. 11, 1990

[54] OBJECTIVE DRIVING DEVICE FOR AN OPTICAL DISK APPARATUS

[75] Inventors: Hiroshi Kokado; Suguru Takishima; Koichiro Nishikawa; Junichi Takeda; Masahiko Sasaki; Isao Okuda; Hiroshi Yamamoto; Masami Ninomiya; Akihiro Tanaka; Hiroshi Motohashi; Makoto Iwaki; Wataru Kubo, all of Tokyo, Japan

[73] Assignee: Asahi Kogaku Kogyo Kabushiki Kaisha, Tokyo, Japan

[21] Appl. No.: 456,068
[22] Filed: Dec. 26, 1989

Related U.S. Application Data

[63] Continuation of Ser. No. 32,001, Mar. 30, 1987, abandoned.

[30] Foreign Application Priority Data

| Mar. 31, 1986 | [JP] | Japan | 61-73613 |
| Mar. 31, 1986 | [JP] | Japan | 61-73614 |
| Apr. 18, 1986 | [JP] | Japan | 61-89518 |
| Apr. 21, 1986 | [JP] | Japan | 61-91871 |
| Apr. 26, 1986 | [JP] | Japan | 61-95901 |
| Apr. 26, 1986 | [JP] | Japan | 61-95902 |
| Apr. 28, 1986 | [JP] | Japan | 61-100472 |
| Apr. 30, 1986 | [JP] | Japan | 61-99732 |
| May 7, 1986 | [JP] | Japan | 61-104452 |
| May 14, 1986 | [JP] | Japan | 61-110113 |
| May 16, 1986 | [JP] | Japan | 61-112079 |
| Jun. 18, 1986 | [JP] | Japan | 61-141569 |
| Jun. 26, 1986 | [JP] | Japan | 61-150220 |
| Oct. 15, 1986 | [JP] | Japan | 61-157801[U] |

[51] Int. Cl.⁵ .................................................. G11B 7/09
[52] U.S. Cl. .................................... 369/46; 369/44; 369/54; 369/112; 369/118; 369/120; 250/201.1
[58] Field of Search ............. 250/201, 202, 211 J; 350/247, 252, 255, 6.3; 369/43–46, 53–54, 58, 111, 112, 118, 120

[56] References Cited

U.S. PATENT DOCUMENTS

| 4,032,776 | 6/1977 | van Rosmalen | 369/45 X |
| 4,063,287 | 12/1977 | van Rosmalen | 369/44 |
| 4,135,083 | 1/1979 | Van Alem et al. | 369/45 X |
| 4,135,206 | 1/1979 | Kleuters et al. | 369/44 X |
| 4,302,830 | 11/1981 | Hamaoka et al. | 350/247 X |
| 4,356,392 | 10/1982 | Wittekoek et al. | 369/44 X |
| 4,374,324 | 2/1983 | Van Rosmalen et al. | 369/44 X |
| 4,419,614 | 12/1983 | Kimura | 369/46 X |
| 4,425,043 | 1/1984 | van Rosmalen | 369/44 X |
| 4,453,241 | 6/1984 | van de Veerdonk et al. | 369/112 |
| 4,565,757 | 1/1986 | LaBudde et al. | 369/44 X |
| 4,571,026 | 2/1986 | Maruta | 350/255 X |
| 4,589,102 | 5/1986 | Volleau et al. | 369/44 X |
| 4,665,512 | 5/1987 | Andō369 | 44/ |
| 4,679,903 | 7/1987 | Kasahara et al. | 350/255 X |
| 4,736,353 | 4/1988 | Kasai et al. | 369/44 X |
| 4,744,071 | 5/1988 | Bricot et al. | 369/44 |
| 4,773,055 | 9/1988 | Gijzen et al. | 369/44 X |
| 4,780,865 | 10/1988 | Yamakawa | 369/44 X |
| 4,797,866 | 1/1989 | Yoshikawa | 369/43 |

FOREIGN PATENT DOCUMENTS

| 61-208641 | 9/1986 | Japan . |
| 61-224143 | 10/1986 | Japan . |
| 62-34337 | 2/1987 | Japan . |
| 62-40628 | 2/1987 | Japan . |
| 62-40630 | 2/1987 | Japan . |
| 62-112235 | 5/1987 | Japan . |

*Primary Examiner*—Aristotelis M. Psitos
*Assistant Examiner*—W. R. Young
*Attorney, Agent, or Firm*—Sandler, Greenblum & Bernstein

[57] ABSTRACT

An optical disk apparatus comprises an optical pickup having an optical pickup body carrying a laser and a photodetector responsive to light emitted from the laser and reflected by the optical disk for producing tracking error signals mounted on the optical pickup body for reciprocal movement in a tracking direction responsive to operation of an actuator, and supports an objective for focusing the beam on the disk. A position sensor produces position signals in response to displacement of the movable portion in the tracking direction. Finally a servo tracking circuit outputs driving signals to the actuator on the basis of tracking error signals produced either in response to tracking error signals produced from outputs of the photodetector and position signals produced from output signals of the position sensor, in response only to the latter. The optical disk apparatus having the foregoing construction eliminates direct-current offset included in tracking error signals, stabilizes driving of the objective, and reduces access time.

22 Claims, 21 Drawing Sheets

F I G. 37
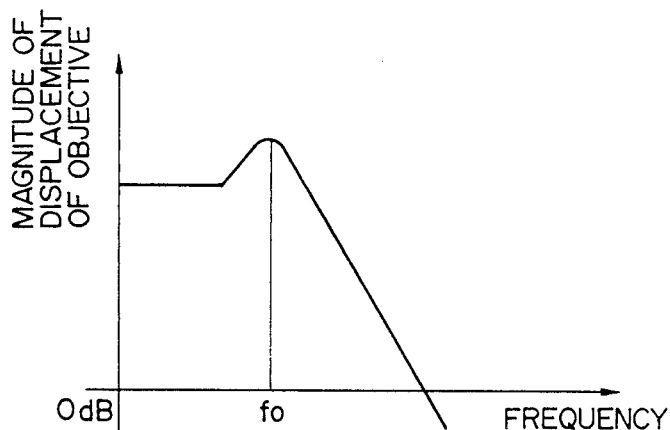
F I G. 38
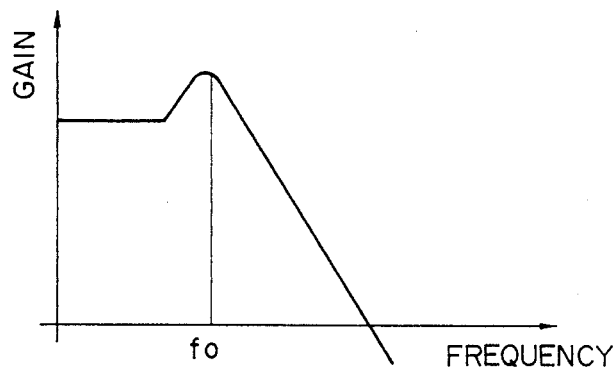

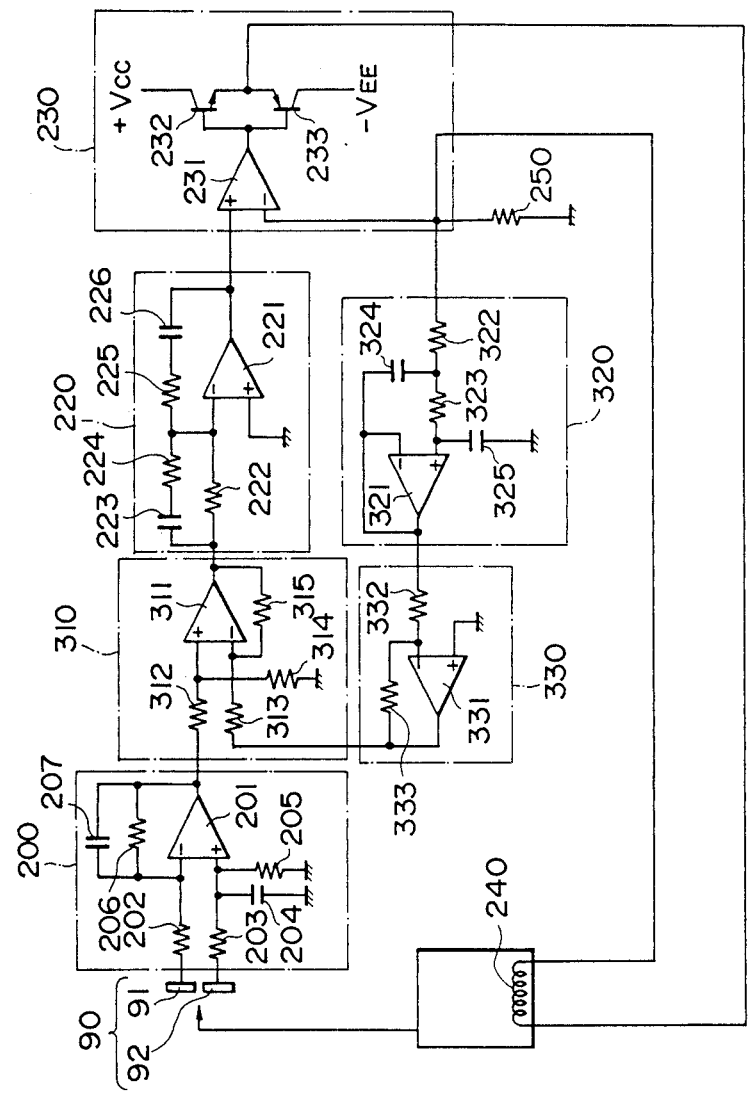
F I G. 39

PRIOR ART
FIG.44(a)
PRIOR ART
FIG.45(a)
PRIOR ART
FIG.46(a)
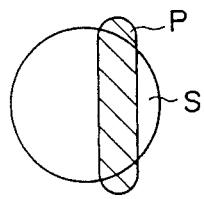 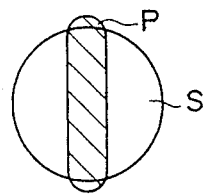 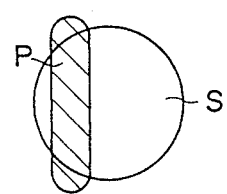
PRIOR ART
FIG.44(b)
PRIOR ART
FIG.45(b)
PRIOR ART
FIG.46(b)
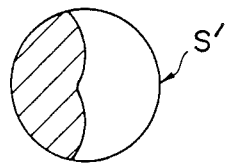 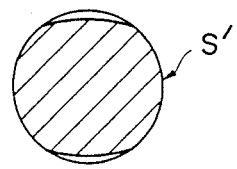 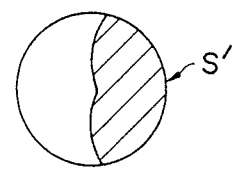

OBJECTIVE DRIVING DEVICE FOR AN OPTICAL DISK APPARATUS

This application is a continuation of application Ser. No. 032,001, filed Mar. 30, 1987, now abandoned.

BACKGROUND OF THE INVENTION

1. Field of the Invention

The present invention relates to an optical disk apparatus equipped with an optical pickup in which an objective is displaced with respect to an incident laser beam during servo tracking and the detection of tracking error signals is effected according to the so-called push-pull system.

2. Description of the Prior Art

It has been known that there are two problems associated with this kind of optical disk apparatus as will be explained hereunder.

One problem is that if the push-pull system which is the simplest in structure and achieves an accurate result is adopted as a tracking error detecting means, tracking error signals detected include direct-current offset and therefore a correct servo tracking driving of the objective cannot be achieved.

The detection of tracking errors using the push-pull system may be effected, as seen from FIG. 43, in a manner in which a beam spot is formed on an optical disk D by means of an objective 1, then reflected towards a beam splitter 2 disposed between a laser emitting device (not shown in FIG. 43) and the objective 1 and the beam splitter 2 transmits the beam to a binary divided photodetector 3. A pit and/or pregrooves formed on the optical disk D causes diffraction of the laser beam and for that reason, the diffraction image formed on the binary divided photodetector 3 has a dark portion and bright portion depending on the relative positions of the spot S and pit P on the optical disk D. Some examples of such relative positions of the spot and the pit are illustrated in FIGS. 44(a), 45(a) and 46(a), while each corresponding diffraction image S' is schematically shown in FIG. 44(b), FIG. 45(b) or FIG. 46(b). In each figure (b) of FIGS. 44 to 46, the dark portion is depicted as a shaded area and if the position of a spot S coincides with that of a pit P as shown in FIG. 45(a), a dark image such as that shown in FIG. 45(b) is formed on the photodetector 3.

As will be seen from FIGS. 47 and 48, the binary divided photodetector 3 has two light receiving portions 3a and 3b arranged in a parallel relation along the direction corresponding to the longitudinal direction of the image of the pit P projected on the diffraction image S', each of which outputs electric signals in proportion to the intensity of light received.

If the position of a spot S coincides with that of a pit P, the electric signal of one portion 3a is equal to that of other portion 3b. And if the position of a spot S drifts from that of a pit P in a right or left direction, the electric signal of one portion can be increased, and that of the other portion can be decreased.

These electric signals are processed with a subtracter to determine the relative positions of the spot S and the pit P and the subtracter outputs the detected relative positions as the tracking error signals.

If a tracking error is detected and only the objective 1 in the optical systems is moved to a position, shown by broken line in FIG. 43 so as to compensate for the detected tracking error, the reflected beam changes the light path (see broken line in FIG. 43) while the positions of optical systems other than the objective 1 remain unchanged and therefore, the position of diffraction images S' formed on the photodetector 3 is, as a whole, displaced to that shown by the broken line in FIG. 48. On the other hand, the correct position of the diffraction image which is observed if the optical axis $O_1$ of the objective 1 coincides with the center line of the laser beam is shown in FIG. 47 (see alternate long and shot dash line.)

Moreover, a luminous flux transmitted to the objective 1 has a intensity distribution as is shown in FIG. 43 with a peak at the center. Therefore, when the objective 1 is moved, for example, by tracking on the radial run-out pit and/or pregroove, the intensity distribution of the luminous flux transmitted to the objective 1 causes a change and in turn there is observed a change of the luminance in the diffraction image S' formed on the binary divided photodetector 3 for reading signals.

Consequently, the tracking error signals outputted from the subtracter become non-uniform because of the presence of direct-current offset as is shown in FIG. 41, even if the positions of the spot S and the pit P are aligned as shown in FIG. 45(a). Thus, the position of spot S cannot correctly be aligned with that of pit P even when the objective 1 is displaced on the basis of such tracking error signal.

The second problem associated with the conventional optical disk apparatus is observed when the optical pickup is moved at an extremely high speed or is abruptly stopped during accessing the spot formed by the objective to a desired track. That is, under such condition, the portion supporting the objective causes vibration and then the stationary state is achieved according to an attenuation vibration curve shown in FIG. 42 (see solid curve). This means that a relatively long time interval is required until the position of beam irradiating the optical disk D is completely stabilized and this is turn means that the reading of signals from the optical disk D cannot be effected immediately after access.

SUMMARY OF THE INVENTION

As is apparent from the foregoing description, the conventional optical disk apparatus in which tracking errors are detected according to the push-pull system has problems to be solved. Consequently, there has been a strong need for optical disk apparatus which have no such disadvantages and, on the contrary, provide those capable of eliminating direct-current offset included in tracking error signals and reducing the access time.

Accordingly, it is an object of the present invention to provide an optical disk apparatus which permits the elimination of direct-current offset included in tracking error signals, the direct-current offset appearing due to the displacement of an objective in a tracking direction when the detection of the tracking error is carried out using the push-pull system, and moreover which permits quite stable driving of the objective.

Another object of this invention is to provide an optical disk apparatus capable of reducing the access time by rapidly attenuating the vibration of an objective encountered during, in particular, an abrupt access.

The above mentioned and other objects of this invention can be accomplished by providing optical disk apparatus as will hereunder be described.

According to one aspect of this invention, the foregoing two objects can surely be achieved and an optical disk apparatus provided in which an optical pickup is provided with a position sensor for detecting the displacement of a movable portion supporting an objective in a tracking direction relative to the body of the optical pickup, so that a tracking servo circuit outputs driving signals to an actuator for driving the movable portion of the optical pickup in the tracking direction on the basis of the tracking error signals and the position signals or on the basis of the position signals.

According to the optical disk apparatus having the foregoing construction, the magnitude of displacement of the movable portion or the objective in the tracking direction can surely be detected as position signals by means of the position sensor and thus, even if detecting tracking errors with the push-pull system, the direct-current offset can certainly be removed from the tracking error on the basis of the position signals by prior estimation of the magnitude of the direct-current offset in proportion to the magnitude of the displacement of the objective.

Moreover, in the optical disk apparatus of the aforementioned construction, the vibration of the movable portion during an access can be detected from the change in position signals observed and therefore, the vibration can rapidly be attenuated by inputting a driving signal capable of compensating the vibration to the actuator for driving a movable portion in the tracking direction.

According to another aspect of this invention, the foregoing first object of this invention may be achieved and the optical disk apparatus includes a feedback circuit for removing direct-current offset included in driving signals, which results from the displacement of the movable portion or the objective in a tracking direction, and which is incorporated into the servo tracking circuit which outputs the driving signals, on the basis of tracking error signals detected according to the . push-pull system, to an actuator for driving the movable portion of optical pickup in the tracking direction and that the feedback circuit has a low-pass filter to obtain a corresponding displacement voltage proportional to the magnitude of displacement of the movable portion, from the driving signals.

According to such construction, it becomes possible for the low-pass filter to output a signal in proportion to the magnitude of displacement of the movable portion or the objective, and thus the direct-current offset can be eliminated by means of the output signal from the low-pass filter by prior calculation of the direct-current offset depending upon the displacement of the objective, even when detecting the tracking errors by the push-pull system.

BRIEF DESCRIPTION OF THE DRAWINGS

The optical disk apparatus according to the present invention will now be described in more detail with reference to the accompanying drawings; wherein

FIG. 1 is a cross-sectional view taken along line I—I of FIG. 2 and illustrating an optical pickup in which the movable portion thereof is rotatably displaced and a position sensor, including a light emitting device and a pair of photodetectors or light receiving device, is disposed;

FIG. 2 is a top plan view of the optical pickup shown in FIG. 1;

FIGS. 3 to 5 are partially diagrammatic cross-sectional views similar to FIG. 1 illustrating variations of the position sensor shown in FIG. 1, FIG. 6 is a cross-sectional view taken along line VI—VI of FIG. 5;

FIG. 7 is a circuit diagram illustrating one example of the servo tracking circuit; and FIG. 8 is a detail view schematically illustrating the structure of a semiconductor position sensitive device;

FIG. 9 is a partially diagrammatic cross-sectional view showing an optical pickup provided with a position sensor comprising a light emitting device, a pair of photodetectors and a reflecting plate, the movable portion of which is rotatably displaced;

FIG. 10 is a cross-sectional view taken along line X—X of FIG. 9;

FIG. 11 is a schematic top plan view of a variation of the reflecting plate;

FIG. 12 is a top plan view of a light pickup equipped with a position sensor comprising a light emitting device, a pair of photodetector elements and a reflecting plate, while the movable portion thereof is slidably displaced; and FIG. 13 is a perspective view illustrating a part of the optical pickup shown in FIG. 12;

FIG. 14 is a partially diagrammatic cross-sectional view showing an optical pickup provided with a position sensor which includes a light emitting device, a photodetector and a light controlling member, the movable portion thereof being rotatably displaced or moved;

FIG. 15 is a cross-sectional view taken along line XV—XV of FIG. 14;

FIGS. 16 to 19 are top plan views illustrating variations of the light controlling member; and FIG. 20 is a cross-sectional view illustrating a variation of the optical pickup shown in FIG. 14;

FIG. 21 is a partially diagrammatic sectional view of an optical pickup equipped with a position sensor including a light emitting device, a pair of photodetector elements and a sight through hole, the movable portion thereof being rotatably displaced;

FIG. 22 is a detail view showing the arrangement of a pair of photodetectors;

FIG. 23 is a top plan view showing an optical pickup having a position sensor which includes a light emitting device, a pair of photodetectors and a sight through hole, in which the movable portion of the optical pickup can be slidably displaced; and FIG. 24 is a perspective view showing a part of the optical pickup shown in FIG. 23;

FIG. 25 is a sectional view illustrating an optical pickup provided with a position sensor including a laser emitting device, a pair of photodetectors and a sight through hole, in which the movable portion of the optical pickup can be rotatably displaced;

FIG. 26 is a sectional view showing an optical pickup provided with a position sensor which comprises a laser emitting device and a pair of photodetectors and in which the movable portion of the pickup is rotatably displaced;

FIGS. 27 and 29 are two sectional views showing two variations of the optical pickup shown in FIG. 26; and FIG. 28 is a detail view schematically showing the arrangement of a pair of the photodetectors illustrated in FIG. 27;

FIG. 30 is a top plan view illustrating an optical pickup equipped with a position sensor which includes a strain gage, the movable portion of which is rotatably displaced; and FIG. 31 is a circuit diagram illustrating a circuit which detects change in resistance of the strain gage;

FIG. 32 is a top plan view showing an optical pickup provided with a position sensor including a capacitor which is composed of electrode plates arranged opposite to each other, in which the movable portion of the optical pickup can be rotatably displaced; and FIG. 33 is a circuit diagram of a circuit which detects change in capacity of the capacitor;

FIG. 34 is a top plan view of an optical pickup equipped with a position sensor comprising a pair of electromagnetic tranceducer devices, in which the movable portion of the optical pickup can be rotatably displaced; and FIG. 35 is a sectional view taken along the line XXXV-XXXV of FIG. 34;

FIGS. 36 to 39 are diagrams illustrating an example of the optical disk apparatus according to present invention relating to the second aspect of this invention;

FIG. 36 is a circuit diagram showing a constant-voltage driving type servo tracking circuit;

FIG. 37 is a diagram showing a displacement-frequency characteristic curve, in which the magnitude of displacement of the objective is plotted against frequencies of driving signals;

FIG. 38 is a diagram showing a gain-frequency characteristic curve, the gain being ascribed to the low-pass filter shown in FIG. 36; and FIG. 39 is a circuit diagram illustrating a constant-current driving type tracking servo circuit;

FIGS. 44(a), 45(a) and 46(a) are diagrams schematically illustrating the relative positions of the spot and the pit;

FIGS. 44(b), 45(b) and 46(b) are diagrams schematically illustrating bright and dark (shade) areas in the diffraction images formed corresponding to relative positions of the spot and the pit shown in FIGS. 44(a), 45(a) and 46(a) respectively;

FIG. 47 shows the condition observed when the optical axis of the laser beam is coincident with that of the objective and FIG. 48 shows the condition observed if the optical axes thereof are not coincident with each other.

DETAILED DESCRIPTION OF THE PREFERRED EMBODIMENTS

The present invention will become more apparent from the following description of preferred embodiments or examples thereof.

Referring to FIGS. 1 to 35, preferred embodiments relating to the first aspect of the present invention are shown and will be explained below. In addition, the following examples are distinguished principally on the basis of the difference in positon sensors attached to the optical pickup and therefore, the constructions of common components thereof will be explained only in the first example.

(FIRST EXAMPLE)

Figure 1:
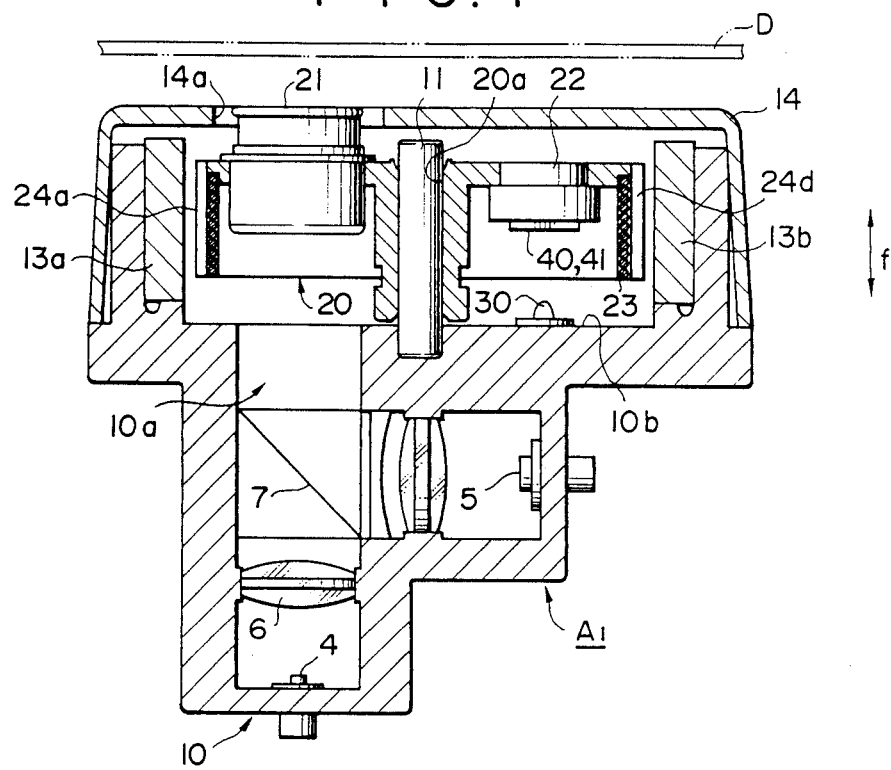
FIGS. 1 to 8 are diagrams showing an example of the optical disk apparatus of the present invention in accordance with the first aspect of this invention.
Figure 2:
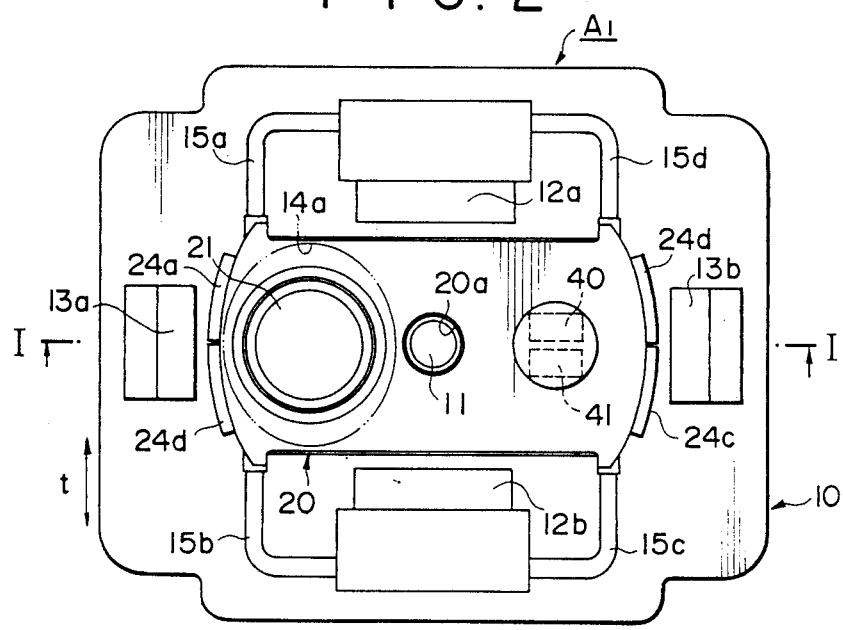

As seen from FIG. 1 and FIG. 2 (which is a top plan view of FIG. 1), an optical pickup $A_1$ comprises an optical pickup body 10 and a movable portion 20 fixed to the optical pickup body 10 through a guide shaft 11 which is vertically mounted on the optical pickup body 10. The optical pickup $A_1$ reciprocates in the radial direction of an optical disk D by means of a sliding mechanism.

Figure 49:
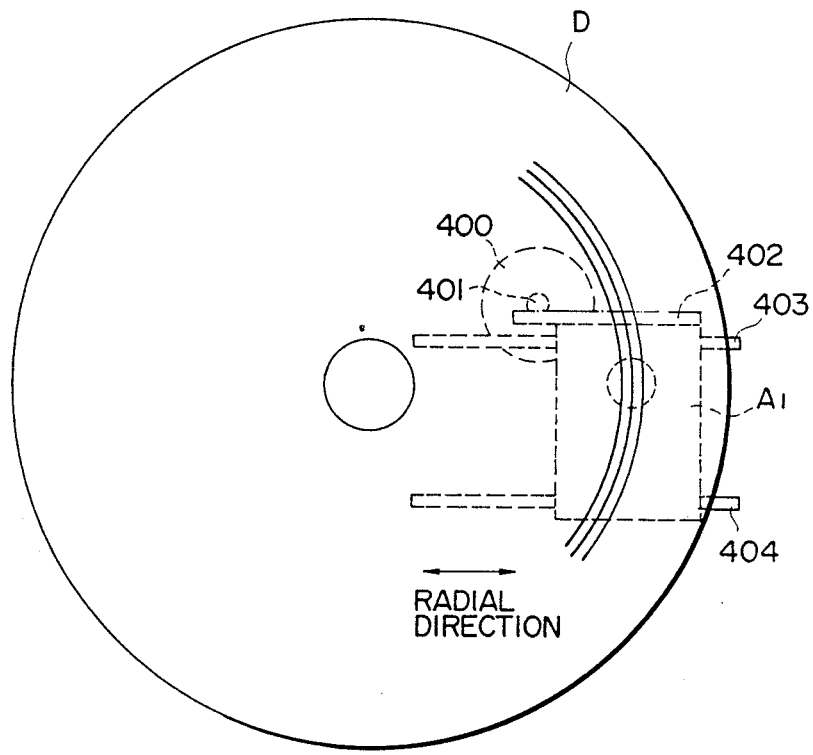
FIG. 49 is diagram explaining the conceptual construction of the sliding mechanism.

The conceptual construction of the sliding mechanism is shown in FIG. 49. This mechanism includes sliding motor 400, pinion 401 which is attached to the output axis of sliding motor 400, and a rack 402 which is mounted on optical pickup A1.

The optical pickup A1 which is mounted on the guide rails 403, 404 is moved in the radial direction of disk D by the sliding motor 400.

The optical pickup body 10 includes an opening serving to guide light in which a laser emitting device 4 generating a laser beam and a photodetector 5 receiving the laser beam reflected by the optical disk D are disposed. Moreover, the movable portion 20 supports an objective 21 which can focus the laser beam on the optical disk D.

Furthermore, the optical pickup body 10 is provided with two pairs of magnets, in which each pair of magnets is arranged so as to face to each other with the movable portion 20 therebetween. Among them, those disposed on or along the longer sides are referred to as focusing magnets 12a, 12b and those disposed on or along the shorter sides are referred to as tracking magnets 13a, 13b.

A hood 14 is mounted on the upper portion of the optical pickup body 10 so as to cover the movable portion 20 and it has an opening 14a capable of only exposing the objective 21.

The movable portion 20 is in the form of a rectangular plane having circular arc-like shorter sides and a hole 20a for inserting the shaft passing therethrough so as to be coaxial with the guide shaft 11 which is vertically mounted to the optical pickup body 10 at its center. Thus, the movable portion 20 is installed in the optical pickup body 10 through the shaft hole 20a for engaging the shaft and can freely slide in the axial direction and the rotational direction of the guide shaft 11.

The movable portion 20 is also provided with a balancer 22 mounted thereon at a position symmetrical with the objective 21 with respect to the guide shaft 11 so as to compensate for the non-uniformity in the weight distribution of the movable portion 20 due to the presence of the objective 21. A focusing coil 23 is wound at the sides of the movable portion 20 and two pairs of tracking coils 24a, 24b, 24c and 24d are also wound at the shorter sides and have a circular arc-like shape, so as to cover the focusing coil 23.

Together with the magnets mounted on the optical pickup body 10, these coils constitute two different actuators, one of which drives the movable portion 20 in the focusing direction f and the other of which drives the same in the tracking direction t. In other words, when current flows through the focusing coil 23, the latter generates a magnetic field which cooperates with the focusing magnets 12a and 12b to generate a driving force which tends to cause displacement of the movable portion 20 in the focusing direction f, while similarly the tracking coils 24a,24b,24c and 24d cooperate with the tracking magnets 13a and 13b to generate a driving force which has a tendency to drive or displace the movable portion 20 in the tracking direction t.

There are installed four suspenders 15a, 15b, 15c and 15d between the optical pickup body 10 and the movable portion 20, the suspenders being composed of an elastic material such as rubber. These suspenders elastically connect the optical pickup body 10 with the movable portion 20 and serve to return and maintain the movable portion 20 to its neutral position when the movable portion 20 is not influenced by the driving force generated due to the electromagnetic interaction between the actuators, i.e., the coils are not electrified.

In the example shown in FIGS. 1 and 2, the position sensor for detecting the displacement of the movable portion 20 in the tracking direction consists of a light emitting device 30 and a pair of photodetectors 40 and 41.

The light emitting device 30 is placed on the bottom surface 10b of the optical pickup body 10, which faces the movable portion 20, while the paired photodetectors 40 and 41 are disposed on the lower surface of the balancer 22 of the movable portion 20 so as to face to the light emitting device 30. These paired photodetectors 40, 41 are arranged along the tracking and driving direction t of the movable portion 20 as shown in FIG. 2 so as to directly receive the light from the light emitting device 30.

The example of the aforementioned light emitting device 30 includes a light emitting diode and each of the photodetectors 40, 41 may be a device such as a photodiode, which is capable of converting the light energy received to electric energy and outputting electric signals depending on the intensity of the light received.

According to the optical pickup $A_1$ having the foregoing construction, a laser beam emitted from the laser emitting device 4 is changed to a parallel luminous flux due to the action of a collimator lens 6, is transmitted through a beam splitter 7 and then is guided to the objective 21 which focuses the laser beam and forms a spot on the optical disk D.

Then, the laser beam is reflected by the optical disk D. In this respect, the condition of the reflected laser beam varies depending on factors such as the presence or absence of a pit on the surface of the irradiated disk, the deviation between the spot and the pit or the distance between the objective 21 and the optical disk D. Under such conditions, it becomes possible to read information recorded on the optical disk D, or to detect tracking errors and focusing errors by guiding the reflected laser beam to the photodetector 5 whose output contains not only recorded information, but tracking and focusing information which can be obtained by further processing the output of photodetector 5.

The paired photodetectors 40 and 41 are arranged in a parallel relation so that the light from the light emitting device 30 uniformly irradiates them when the movable portion 20 is in the neutral position. When the movable portion 20 is driven in any tracking direction, the quantity of light received by one of the photodetector elements 40 and 41 is decreased and that received by the other photodetector is increased.

Then, the displacement of the movable portion 20 in the tracking direction is detected by carrying out subtraction processing between the signals outputted from the photodetectors 40 and 41.

FIGS. 3 to 6 show variations of position sensors as explained with reference to the aforementioned example. In these variations, the arrangement of the light emitting device 30 and the photodetectors 40 and 41 differ from that in the foregoing example. In these figures, like reference numerals designate like elements in the optical pickup $A_1$ shown in FIG. 1 and the explanation thereof is omitted for the sake of simplicity.

Figure 3:
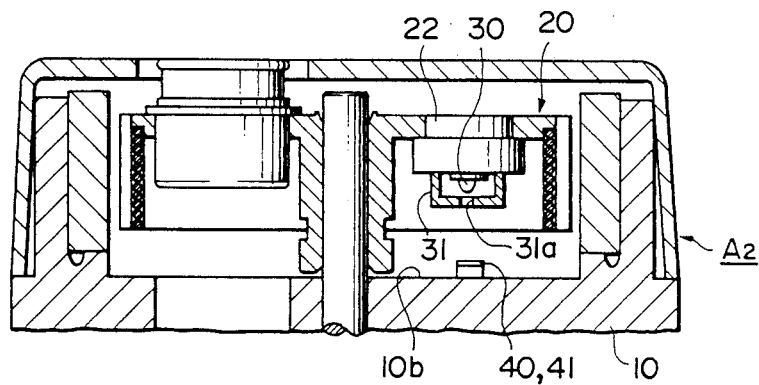

In an optical pickup $A_2$ shown in FIG. 3, a light emitting device 30 is fixed to a balancer 22 of a movable portion 20 and a pair of photodetectors 40 and 41 is disposed on the bottom surface 10b of an optical pickup body 10, and arranged in parallel relation along the tracking driving direction of the movable portion 20. Moreover, a diaphragm 31 is disposed around the light emitting device 30 so as to restrict the range irradiated by the light emitting device 30.

According to the construction shown in FIG. 3, from the light emitted from the light emitting device 30, only the light of the central portion thereof having a rather high intensity is transmitted through an opening 31a of the diaphragm 31, while the light diverged to the circumference is intercepted and therefore the contrast observed between the light irradiating the paired photodetectors 40 and 41 is improved and, moreover, it is also possible to more clearly detect the relative change in the amount of light received by the photodetectors 40 and 41 due to the rotational movement of the movable portion 20.

Figure 4:
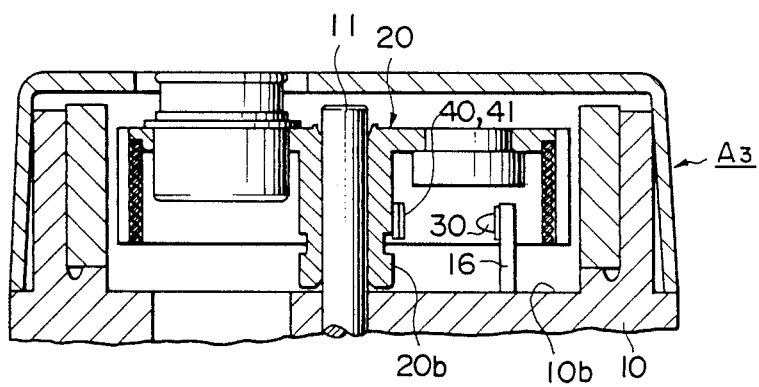

On the other hand, an optical pickup $A_3$ shown in FIG. 4 has a light emitting device 30 for emitting light towards a guide shaft 11, which is disposed on the upper portion of a supporting rod 16 vertically mounted to the bottom surface 10b of an optical pickup body 10. On a movable portion 20, a pair of photodetectors 40 and 41 is arranged in parallel relation along the tracking driving direction of the movable portion 20 and faces toward the light emitting device 30.

Figure 5:
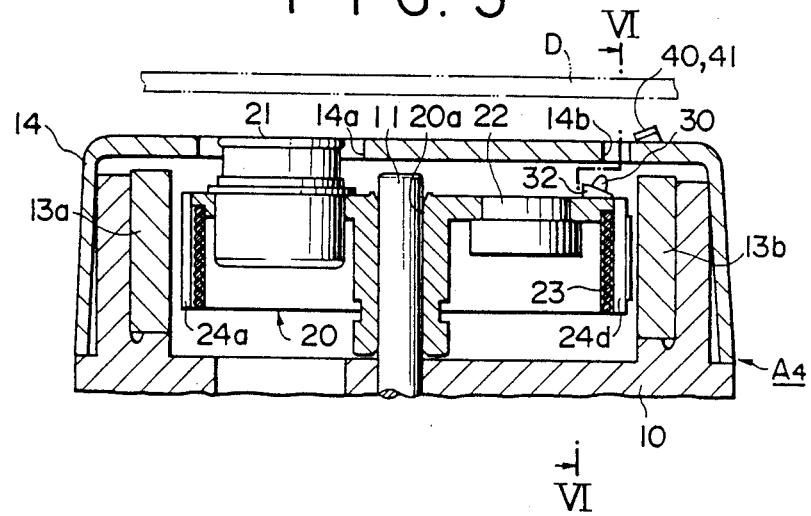
Figure 6:
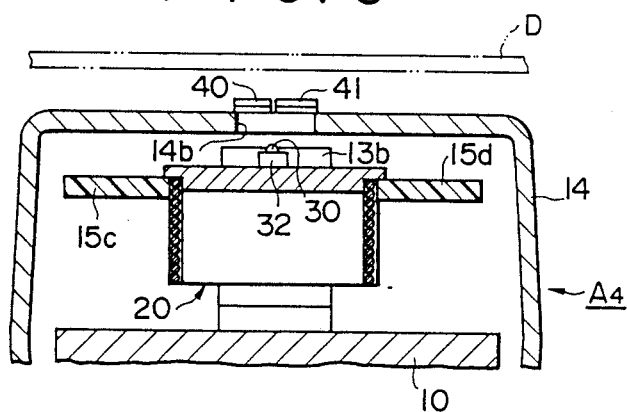

In an optical pickup $A_4$ shown in FIG. 5 and FIG. 6 (which is a sectional view of the optical pickup shown in FIG. 5 taken along the line VI—VI), a light emitting device 30 is placed on a movable portion 20 so as to emit light towards an optical disk D and a pair of photodetectors 40 and 41 is disposed on the surface of a cover 14 facing to the optical disk D, the paired photodetectors receiving the light emitted from the light emitting device 30 and reflected by the optical disk D.

In addition, cover 14 is provided with a long opening 14b which serves to transmit luminous flux from the light emitting device 30 to the optical disk D.

The light emitting device 30 is disposed on a support 32 so as to be inclined to the side of the tracking magnet 13b. Thus, the light emitting device 30, and in particular, the central portion of its light output can irradiate the optical disk D. The light reflected by the disk D is received by the paired photodetectors 40 and 41.

An example of a servo tracking circuit incorporated in the optical disk apparatus of the first aspect according to the present invention will be explained below with reference to FIG. 7.

The servo tracking circuit 100 outputs a driving signal to an actuator for driving the movable portion 20 of the optical pickup in the tracking direction on the basis of tracking error signals obtained from the signals outputted by the photodetector 5 and position signals obtained from signals outputted by the position sensor or simply on the basis of the position signals.

Figure 7:
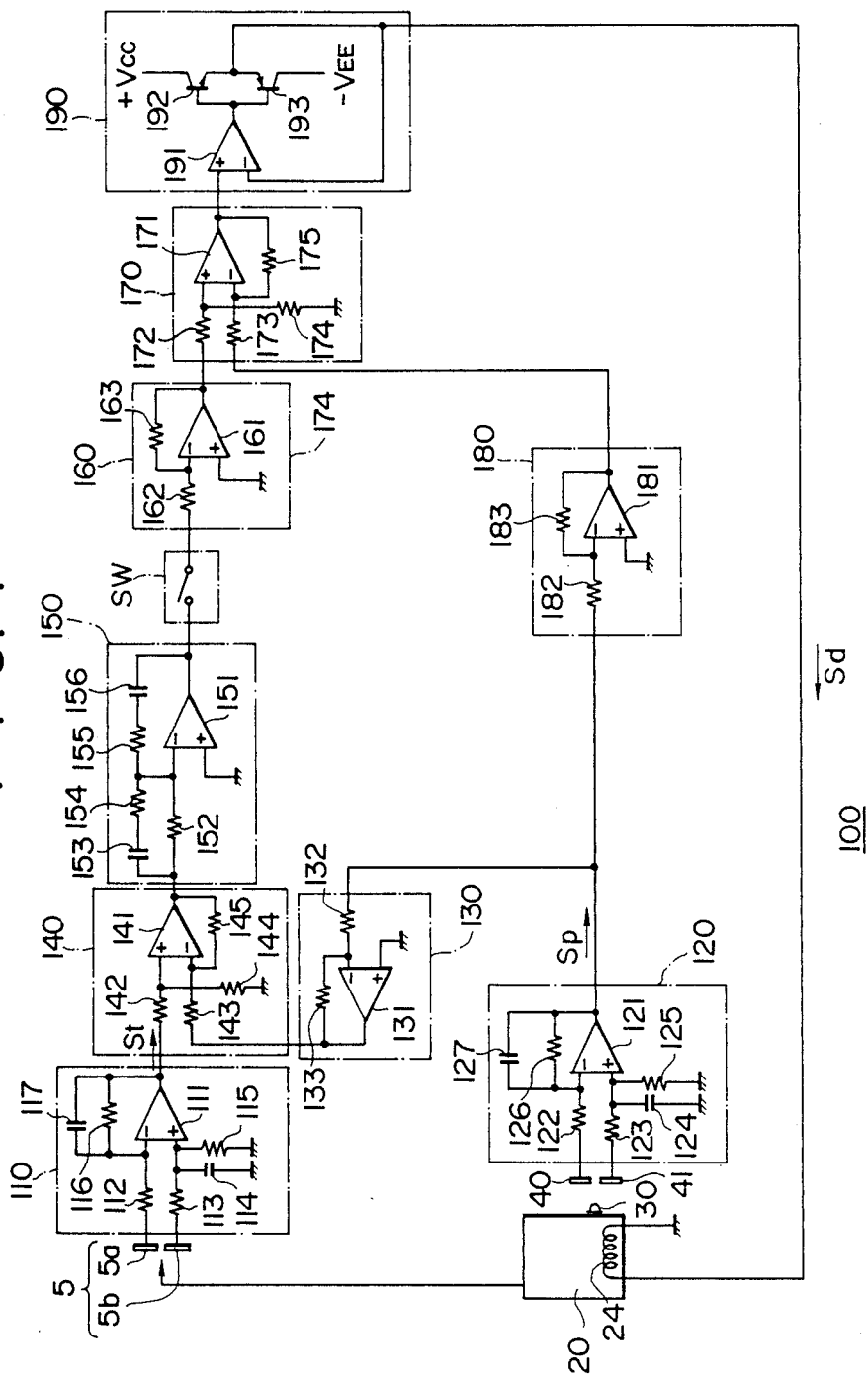

In FIG. 7, although the photodetector 5 consists of a binary divided light receiving portion 5a,5b, it may be required in a practical optical pickup, to detect not only tracking errors but focusing errors and therefore, a multi-divided device may optionally be used instead of such binary divided device.

The light receiving portions 5a and 5b of the binary divided photodetector 5 (the driving circuit thereof is omitted), which receive the laser beam reflected by the optical disk D, are connected to a subtracter 110 for detecting tracking errors, which generates tracking error signals St according to the push-pull system. The subtracter 110 has an operational amplifier 111 (hereunder referred to as Op Amp for simplicity), to the negative terminal of which the light receiving portion 5a is connected through a resistor 112 and to the positive terminal of which the light receiving portion 5b is connected through a resistor 113. Furthermore, a capacitor 114 and a resistor 115, one end of each being grounded are connected to the positive terminal of the Op Amp 111, while a resistor 116 and a capacitor 117 are disposed in parallel between the negative terminal and an output terminal.

On the other hand, the paired photodetectors 40 and 41 (the driving circuit therefor being omitted) receiving the light from the light emitting device 30 (the driving circuit therefor being likewise omitted) are respective connected to a subtracter 120 which outputs position signals Sp. Similar to the foregoing subtracter 110, the subtracter 120 comprises an Op Amp 121, resistors 122, 123, 125 and 126 and capacitors 124 and 127.

The subtracter 120 is connected to an amplifier 130. The amplifier has an Op Amp 131, to the negative terminal of which the output terminal of the subtracter 120 is connected through a resistor 132 and the positive terminal of which is grounded. In addition, a resistor 133 is connected, on the one hand, to the negative terminal of the Op Amp 131 and on the other hand to its output terminal.

The output from the subtracter 110 and that from the subtracter 120, which is multiplied with a suitable coefficient in the amplifier 130, are inputted to a subtracter 140 for removing the direct-current offset included in the tracking error signal St. The subtracter 140 has an Op Amp 141, the positive terminal of which is connected to the output terminal of the subtracter 110 through a resistor 142 and the negative terminal of which is connected to the output terminal of the amplifier 130 through a resistor 143. Moreover, a resistor 144, one end of which is grounded, is connected to the positive terminal of the Op Amp 141, while a resistor 145 is connected on the one hand to the negative terminal of the Op Amp 141 and on the other hand to the output terminal thereof.

The subtracter 140 is connected to a phase compensating circuit 150. The phase compensating circuit 150 is provided with an Op Amp 151, the negative terminal of which is connected to the output terminal of the subtracter 140 through a resistor 152, while the positive terminal is grounded. In addition, a serial circuit consisting of a capacitor 153 and a resistor 154 is connected in parallel to the resistor 152 and a serial circuit consisting of a resistor 155 and a capacitor 156 is connected on the one hand to the negative terminal of the Op Amp 151 and on the other hand to the output terminal thereof.

The phase compensating circuit 150 is connected to an amplifier 160 through a switch SW. The amplifier 160 includes an Op Amp 161 and resistors 162 and 163, as in the case of the foregoing amplifier 130.

The amplifier 160 is connected to a subtracter 170. The subtractor 170 comprises, as in the case of the aforementioned subtracter 140, an Op Amp 171 and resistors 172, 173, 174 and 175.

To the subtracter 170, there is inputted, in a form of antiphase, an output from the subtracter 120 through an amplifier 180. The amplifier 180, similar to the above mentioned amplifier 130, includes an Op Amp 181 and resistors 182 and 183.

The switch SW is connected to an access voltage generator (not shown) and the switch SW is opened during access instructions, that is, when the optical pickup slides so that the spot formed on the optical disk D by means of the laser beam traverses the tracks on the optical disk D and is closed when the spot traces the track thereon.

The subtracter 170 is connected to a driving circuit 190 which outputs a driving signal Sd to an actuator for driving the movable portion 20 of the optical pickup in the tracking direction. This driving circuit 190 includes an Op Amp 191, an NPN-type transistor 192 and a PNP-type transistor 193. To the positive terminal of the Op Amp 191, there is connected the output terminal of the subtracter 170, while the output terminals are connected to the bases of the transistors 192 and 193 respectively. Moreover, the collector of the NPN-type transistor 192 is connected to the positive terminal of a power supply $+V_{CC}$, while that of the PNP-type transistor 193 is connected to the negative terminal of the power supply $-V_{EE}$. Furthermore, the emitter of each transistor 192 or 193 is connected on the one hand to a tracking coil 24 which constitutes an actuator for driving the movable portion 20 of the optical pickup towards the tracking direction and, on the other hand, to the negative terminal of the Op Amp 191.

The operation of the servo tracking circuit is explained as follows. In order to access the optical pickup at a desired position of the optical disk upon operating the optical disk apparatus, the access voltage generator is started to generate an access voltage and at the same time, the switch SW is opened. Due to these operations, the optical pickup, is subjected to an access of extremely high speed and traverses the tracks on the optical disk D and then is abruptly stopped at a desired position.

Figure 42:
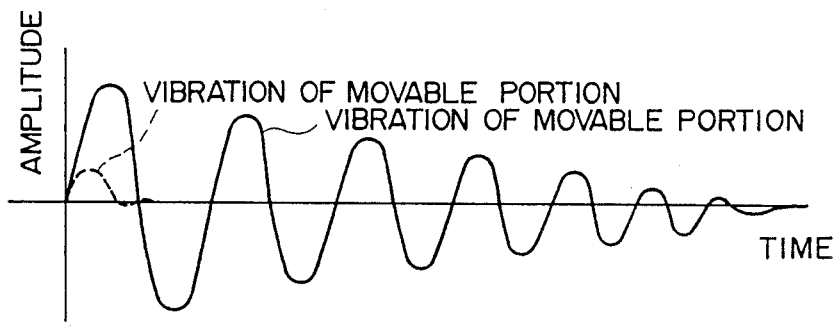
FIG. 42 is a graph showing the vibration of the objective observed after an access.

At this time, unless there is a means for stabilizing the movable portion 20, the movable portion 20 causes vibration, even after the abrupt stopping thereof, as is shown in FIG. 42 (see solid line) and it takes a long period of time until it is completely stabilized.

According to the optical disk apparatus of the invention, the subtracter 120 detects the degree of vibration, i.e., the displacement position of the movable portion 20 on the basis of the signal from the paired photodetectors 40 and 41 which are irradiated with the light emitted by the light emitting device 30, then processes the signal and outputs a position signal Sp.

This position signal Sp is inputted to the subtracter 170 through the amplifier 180 in a form of antiphase and is outputted from the subtracter 170 to the driving circuit 190.

Then, the driving circuit 190 applies a voltage to all tracking coils 24a, 24b, 24c and 24d of the movable portion 20 so that the movable portion 20 is returned to its neutral position in proportion to the signals inputted to the circuit 190, that is, the light emitted from the light emitting device 30 uniformly reaches a pair of the photodetectors 40 and 41.

Thus, the vibration of the movable portion 20 is damped and therefore, even a strong vibration due to abrupt stopping can quite quickly be attenuated as will be seen from FIG. 42 (see broken line) and the reading of signals commences immediately after the access operation.

Figure 41:
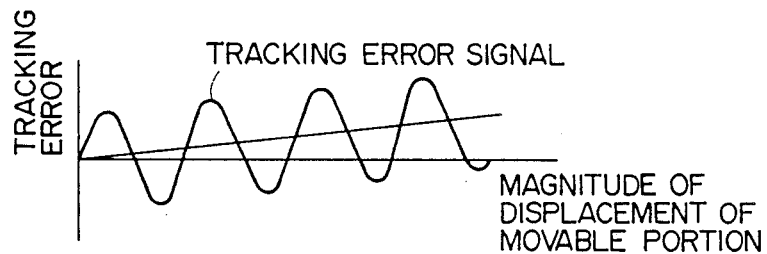
FIG. 41 is a graph of a tracking error signal including direct-current offset.
Figure 48:
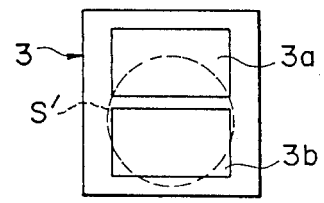

When the optical pickup reproduces information recorded on an optical disk D, the spot of beam can possibly deviate from a desired track of the optical disk D. The deviation is detected as the alteration in the intensity distribution of light on the photodetector 5 for reading signals, as already explained above, and is outputted from the subtracter 110 as a tracking error signal St after precessing. However, when the movable portion 20 causes a displacement towards the tracking direction, as explained before, and even if the spot S and the pit P are correctly aligned with each other, the diffraction image causes a deviation, for instance, as is shown in FIG. 48. As a result, the tracking error signal St includes the direct-current offset (see FIG. 41).

In this case, the optical disk apparatus of the present invention is designed so as to be able to calculate the deviation in the diffraction image from the magnitude of displacement of the movable portion 20 in the tracking direction and to generate a signal for compensating for such deviation for the purpose of removing the foregoing direct-current offset.

In other words, the position signal Sp from the subtracter 120 is first multiplied with a proper coefficient in the amplifier 130, then the processed signal Sp and the tracking error signal St outputted from the subtracter 110 are processed in a separate subtracter 140 to carry out subtraction therebetween. The difference between them outputted from the subtracter 140 is further subjected to a phase compensation processing in the phase compensating circuit 150 and then is amplified by the amplifier 160 to input it to the subtracter 170. On the other hand, the position signal Sp outputted from the subtracter 120 is first properly amplified by the amplifier 180 and is likewise inputted to the subtracter 170.

Figure 40:
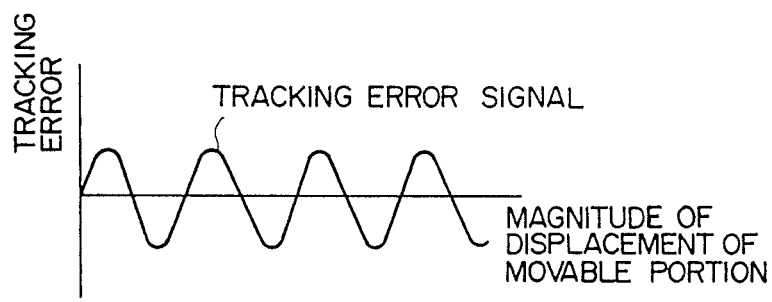
FIG. 40 is a graph of a normal tracking error signal.

Thereafter, a voltage is applied through the driving circuit 190 to tracking coils 24a, 24b, 24c and 24d on the basis of the results obtained in the subtracter 170 and thus the movable portion 20 is driven in the tracking direction. Thus, the direct-current offset included in the tracking error signal St because of the deviation in the diffraction image resulting from the displacement of the movable portion 20 can be compensated for by the position signal Sp and as a result, stable servo tracking driving can surely be effected as is shown in FIG. 40.

In addition, it should be appreciated that the present invention is not limited to the use of a pair of photodetectors 40 and 41, as the light receiving means, which serves to convert light energy received to electric energy, although the foregoing optical pickups $A_1$ to $A_4$ have been, described in the examples in which a pair of photodetectors is utilized.

As examples of such light receiving means other than those mentioned above, for example, a semiconductor position sensitive device which converts the central position (center of gravity) of light received to electric signals and a photodiode array consisting of a plurality of photodiodes arranged in parallel along the tracking driving direction of the movable portion 20 may be used.

Figure 8:
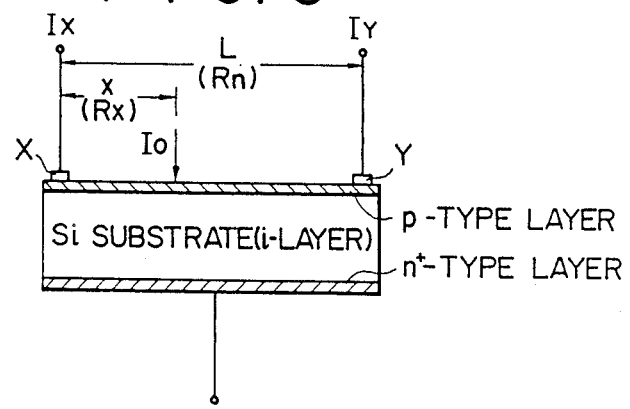

As seen from FIG. 8, a semiconductor position sensitive device, for instance, comprises a p-type layer, $n^+$-type layer, a Si substrate having a high resistance inserted between the p-type and $n^+$-type layers and electrodes X and Y disposed on the p-type layer. If L denotes the distance between the electrodes X, Y; Rn a resistance, x the distance from the electrode X to the position at which a luminous flux is introduced; Rx the resistance thereof and Io the photocurrent generated by the incident luminous flux; the following relations on photocurrents Ix and Iy observed on the electrode X and Y respectively are obtained:

$$Ix = Io\frac{Rn - Rx}{Rn} = Io\frac{L - x}{L} \text{ ; and } Iy = Io\frac{Rx}{Rn} = Io\frac{x}{L}$$

since the length and the resistance are proportional to each other. Thus, the center of gravity of the luminous flux can be determined by calculating the ratio of Ix to Iy irrespective of the intensity of the incident luminous flux.

Utilizing the semiconductor position sensitive device instead of the foregoing paired photodetectors 40 and 41, the displacement of the movable portion 20 in the tracking driving direction can surely be detected.

Moreover, if a photodiode array is used as the means for receiving light, the photodiode array is arranged on a curved line along the tracking driving direction of the movable portion 20, while the light emitting device 30 is preferably covered with a cover having a pinhole through which the central part of the light emitted from the light emitting device 30 is transmitted. Furthermore, the cover may have a lens instead of a pinhole, which serves to focus luminous flux on the photodiode array.

(SECOND EXAMPLE)

Referring now to FIGS. 9 to 13, the second example of the optical pickup of the optical disk apparatus according to the first aspect of the present invention is shown.

Figure 9:
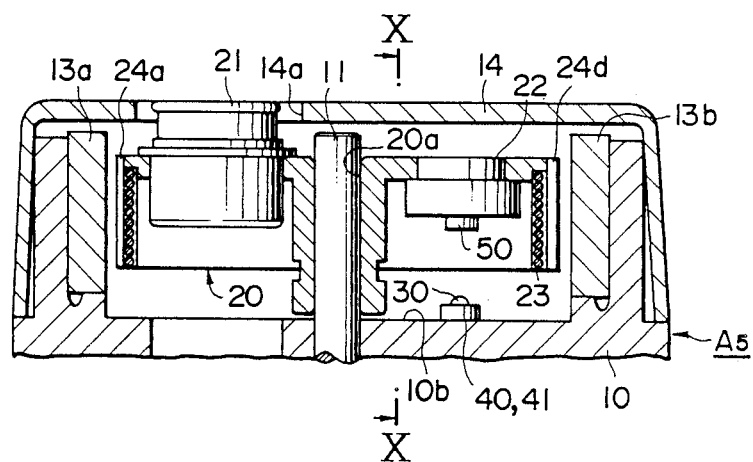
FIGS. 9 to 13 are diagrams showing the second example of the optical disk apparatus relating to the first aspect of this invention.
Figure 10:
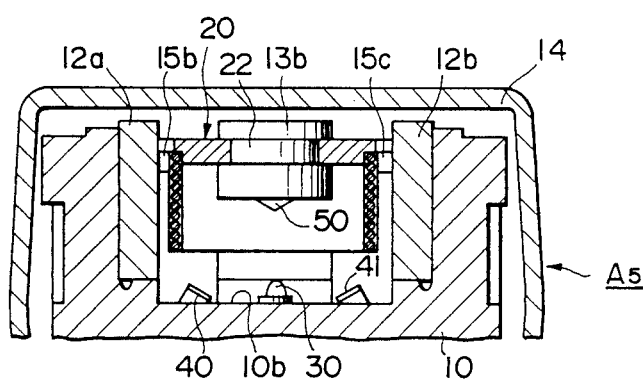

In an optical pickup A$_5$ shown in FIG. 9 and FIG. 10 (which is a sectional view of the optical pickup A$_5$ shown in FIG. 9 taken along the line X—X), a light emitting device 30 and a pair of photodetectors 40 and 41 are disposed on the bottom surface 10*b* of an optical pickup body 10 and a roof mirror 50 is mounted on the lower surface of a balancer 22 which is disposed on a movable portion 20.

Light emitting device 30 and paired photodetectors 40, 41 are arranged along the tracking driving direction of the movable portion 20, the light emitting device 30 being placed at the center of this arrangement. The roof mirror 50 comprises two mirrors which are inclined relative to the vertical center line and are arranged in parallel relation with respect to the center line. Each mirror reflects the light from the light emitting device 30 towards the corresponding photodetector 40 or 41, respectively, and simultaneously change the amount of reflected light which arrives at each of the paired photodetectors 40 and 41 in proportion to the magnitude of displacement of the movable portion 20 in the tracking direction.

Other constructions and operation are identical to those set forth in the first example and therefore, the explanation thereof is omitted for the sake of simplicity.

Figure 11:
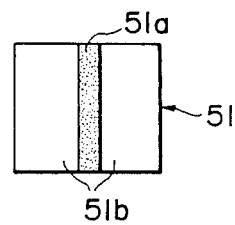

Instead of the roof mirror 50, a plane mirror 51, in which the reflectivity of the central portion 51*a* differs from that of the periphery 51*b* thereof as seen from FIG. 11 may also be used in the present invention.

Figure 12:
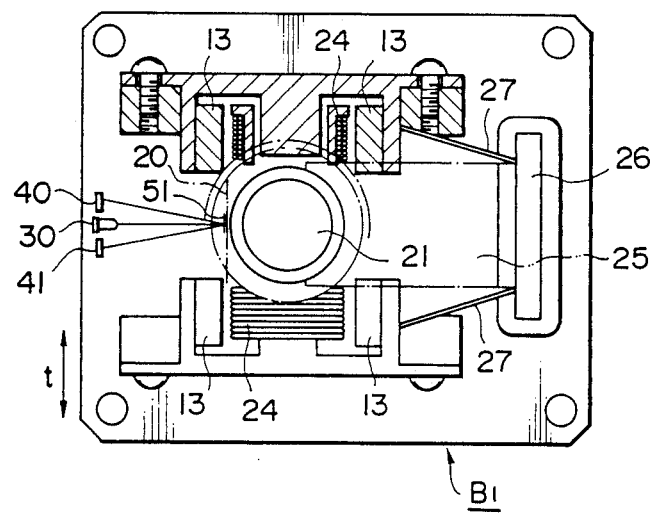
Figure 13:
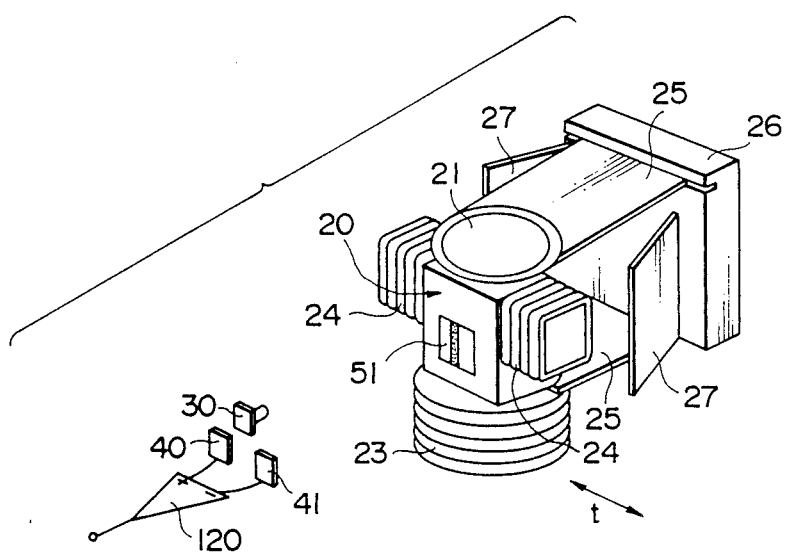

In FIG. 12 and FIG. 13 (in which a part of an optical pickup shown in FIG. 12 is illustrated), an optical pickup B$_1$ is shown and is provided with a position sensor similar to that such as set forth in the foregoing example.

This optical pickup B$_1$ differs from the optical pickup A$_1$ to A$_5$ as explained above, in which the movable portion 20 supporting the objective 21 is rotatably displaced relative to the optical pickup body 10. In the optical pickup B$_1$, a movable portion 20 to which an objective 21, a focusing coil 23 and a tracking coil 24 are disposed, is supported by a relay member 26 through a plate spring 25 for focusing and the relay member 26 is supported by the optical pickup body 10 through a plate spring 27 for tracking.

In the optical pickup B$_1$, the movable portion 20 is likewise driven in the tracking direction t by the action of an actuator for driving the movable portion of the optical pickup in the tracking direction, wherein the actuator comprises the tracking coil 24 and a tracking magnet 13.

The movable portion 20 is equipped with a plane mirror 51 similar to that shown in FIG. 11 and the optical pickup body 10 is provided with a light emitting device 30 and a pair of photodetectors 40 and 41.

The paired photodetectors 40 and 41 are irradiated with the light emitted from the light emitting device 30 and then reflected by the plane mirror 51 at different illuminances, respectively, in proportion to the displacement of the movable portion 20 in the tracking direction t.

Thus, a position signal Sp showing the position of the movable portion 20 after displacement can be obtained by processing the signals outputted from these paired photodetectors 40 and 41 with a subtracter 120 similar to that set forth in FIG. 7 to carry out subtraction therebetween.

Contrary to this example, it may also be possible to adopt a construction in which a light emitting element and a pair of photodetectors are disposed on the movable portion and a reflecting plate is fixed to the optical pickup body.

(THIRD EXAMPLE)

In FIGS. 14 to 20, the third example of an optical pickup of the optical disk apparatus according to the first aspect of this invention is illustrated.

Figure 14:
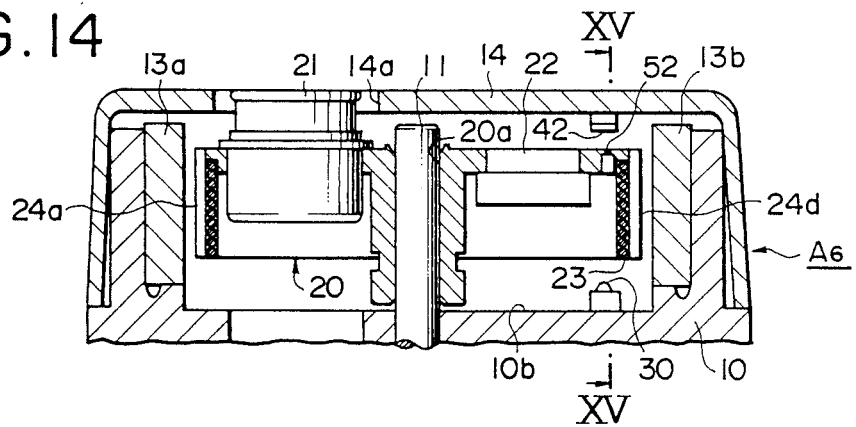
FIGS. 14 to 20 are diagrams showing the third example of the optical disk apparatus of this invention pertaining to the first aspect of this invention.
Figure 15:
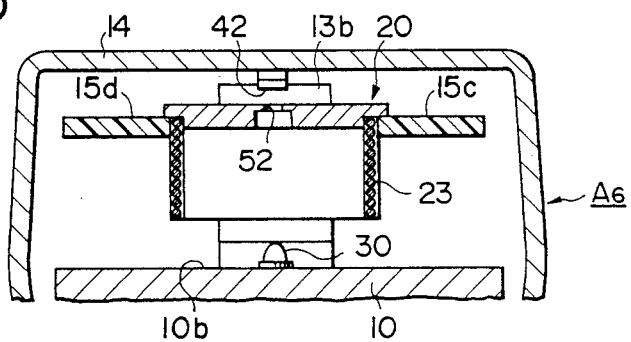
Figure 16:
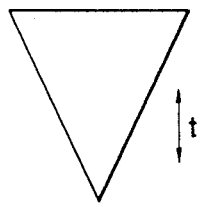

In an optical pickup A$_6$ shown in FIG. 14 and FIG. 15 (which is a sectional view taken along the line XV—XV of FIG. 14), a light emitting device 30 is placed on the bottom surface 10*b* of the optical pickup body 10 and a light controlling member 52 is disposed on the movable portion 20. The light controlling, member 52, which is shown in FIG. 16 in enlarged form, is a sight through hole having a triangular planar shape and therefore, the magnitude of displacement of the movable portion 20 in the tracking direction t has a one-to-one correspondence with the amount of light transmitted through the sight through hole among those emitted from the light emitting device 30. Then, in this example, a photodetector element 42 which converts light energy received to electric signals is disposed at a position facing the light emitting device 30 with the light controlling member 52 therebetween or on the lower surface of a cover 14 and thereby a position signal Sp showing the amount of displacement of the movable portion 20 in the tracking direction is obtained from the signal outputted from the photodetector 42.

Figure 17:
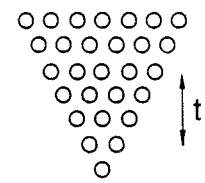
Figure 18:
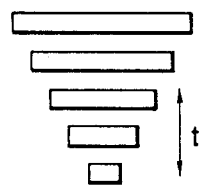
Figure 19:
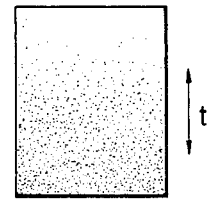

In addition, the light controlling member 52 is not considered to be restricted to the aforementioned triangular hole and other examples may also be used in the present invention. Such examples include, for instance, a plurality of small circular holes as shown in FIG. 17, a plurality of slits pierced in a triangular form (see FIG. 18) or an acrylic plate which is pigmented so that the transmission gradually changes in the tracking direction as shown in FIG. 19.

Figure 20:
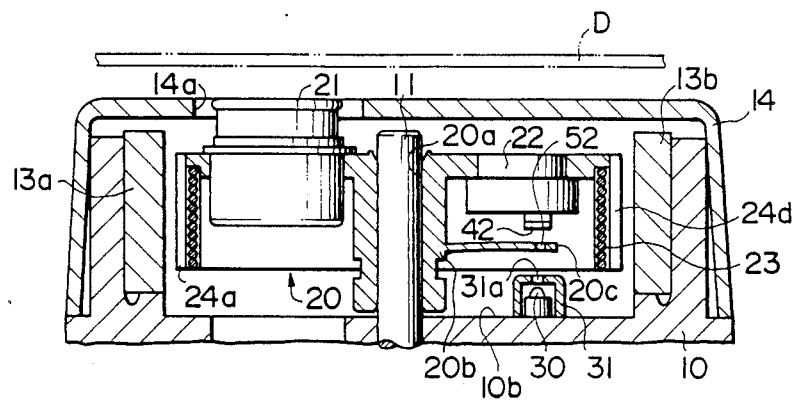

FIG. 20 shows a variation of the foregoing third example, in which a diaphragm 31 for restricting the range irradiated with light from the light emitting device 30 is disposed around the device 30 which is mounted on the bottom surface 10*b* of the optical pickup body 10. Moreover, the movable portion 20 is provided with a photodetector 42 which is fixed to the lower surface of a balancer 22 and a plate member 20*c* having a light controlling member 52 which extends in a radial direction from a bearing portion 20*b* surrounding a guide shaft 11 parallel with the bottom surface 10*b*. The diaphragm 31 is equipped with an opening 31*a* which can transmit the central portion of the light emitted by the light emitting device 30. The light controlling member 52 is irradiated with only the central light emitted by the light emitting device 30 which has a relatively high intensity and the light converged to the circumference is intercepted. Thus, the contrast of the light reaching the photodetector 42 is substantially improved and the position of the movable portion 20 after rotational movement can clearly be detected.

Other constructions and operations of the example are similar to those set forth in the foregoing first example and therefore the explanation thereof is omitted for simplicity.

(FOURTH EXAMPLE)

FIGS. 21 to 24 show the fourth example of an optical pickup according to the optical disk apparatus relating to the first aspect of this invention.

Figure 21:
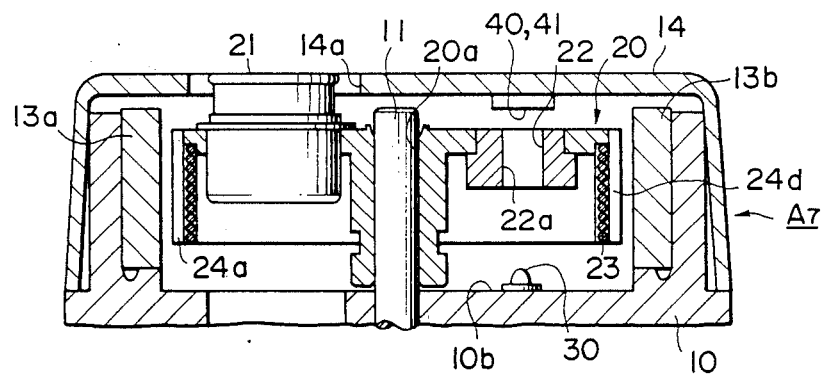
FIGS. 21 to 24 are diagrams showing the fourth example of the optical disk apparatus according to the present invention pertaining to the first aspect of this invention.

An optical pickup A₇ shown in FIG. 21 has a circular planar sight through hole 22a pierced through a balancer 22 of a movable portion 20. In addition, a light emitting device 30 is disposed on the bottom surface 10b of the optical pickup body 10 so as to face the sight through hole 22a and a pair of photodetectors 40 and 41 is mounted on a cover 14 so as to be opposite to the light emitting device 30 with the sight through hole 22a therebetween.

Figure 22:
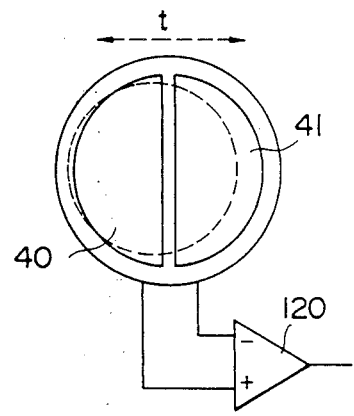

The paired photodetectors 40, 41, as shown in FIG. 22 as an enlarged view, are arranged in parallel along the tracking driving direction t of the movable portion 20 and when the movable portion 20 is maintained at its neutral position, they are uniformly irradiated with the light emitted by the light emitting device 30.

According to the optical pickup of such construction, when the light emitted from the light emitting device 30 is transmitted through the sight through hole 22a, the periphery thereof is intercepted and only the light in a specific range is transmitted therethrough and reaches the paired photodetectors 40 and 41. If the movable portion 20 causes the displacement in the tracking direction, the range of the light which is transmitted through the sight through hole 22a and reach the photodetectors 40,41 is also displaced. A range irradiated with light is shown in FIG. 22 by the broken line, which is observed when the movable portion 20 is displaced to some degree in the tracking direction t.

Therefore, the amount of light received by the photodetectors 40 and 41 are relatively changed due to the displacement of the range which is irradiated with light. In such a case, a position signal Sp which represents the magnitude of displacement of the movable portion 20 can be obtained by calculating the difference between the signals outputted from the photodetectors 40 and 41.

Figure 23:
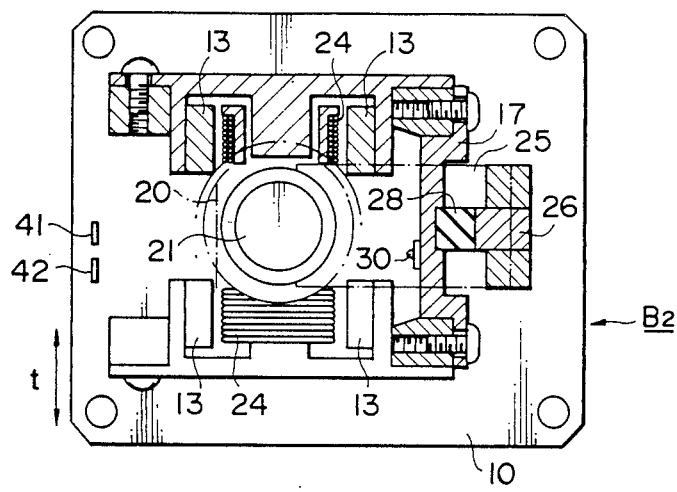
Figure 24:
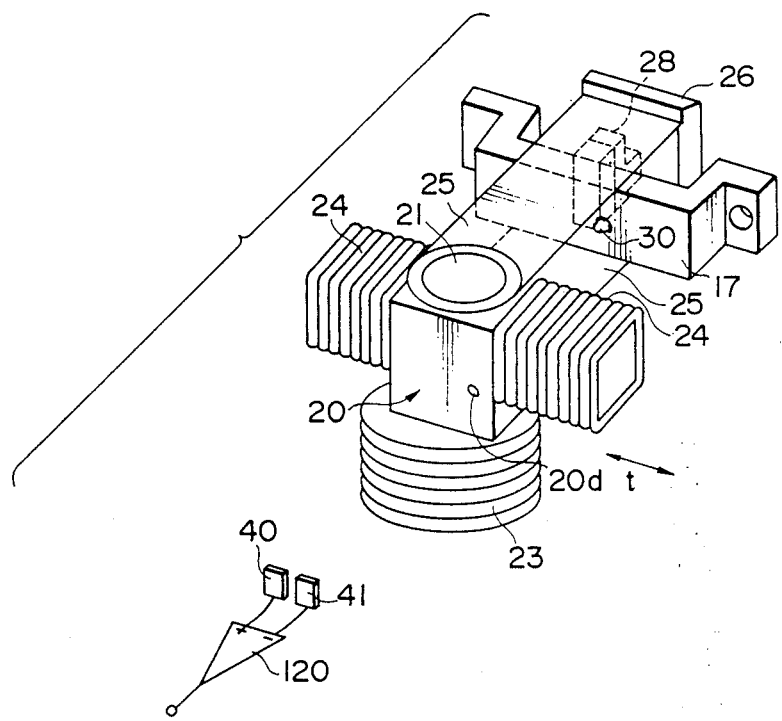

An optical pickup B₂ provided with a position sensor similar to that set forth in the foregoing example is shown in FIG. 23 and FIG. 24, in which a part of the optical pickup shown in FIG. 23 is depicted. The optical pickup B₂ has a construction quite similar to that disclosed in FIG. 12 except that an elastic member 28 is used instead of the plate spring 27 for tracking shown in FIG. 12.

The movable portion 20, provided with an objective 21, a focusing coil 23 and a tracking coil 24, is supported by a relay member 26 through a plate spring 25 for focusing. The relay member 26 is also supported by a supporting member 17 of the optical pickup body 10 through the elastic member 28.

A light emitting device 30 is disposed on the supporting member 17 and a pair of photodetectors 40 and 41 are arranged in parallel along the tracking direction t at a position facing the light emitting device 30 with the movable portion 20 therebetween. Moreover, a sight through hole 20d passes through the movable portion 20 so that the light from the light emitting devices 30 is transmitted therethrough and reaches the photodetectors 40 and 41.

In the optical pickup B₂, the movable portion 20 is likewise driven in the tracking direction t by the action of an actuator for driving the same in the tracking direction, wherein the actuator is comprised of a tracking coil 24 and tracking magnets 13.

Thus, when the movable portion 20 is driven in the tracking direction t, the range of irradiation light, which is emitted by the light emitting device 30 and reaches the photodetectors 40 and 41, causes displacement as has already been explained with reference to the foregoing optical pickup A₇.

Then, the signals outputted from the photodetectors 40 and 41 can be processed in a subtracter 120 (shown in FIG. 7) to obtain a positon signal Sp which represents the magnitude of displacement of the movable portion 20.

(FIFTH EXAMPLE)

Referring now to FIGS. 25 to 29, there is shown the fifth example of an optical pickup according to the optical disk apparatus of this invention relating to the first aspect of this invention. In this example, a position sensor comprises a light emitting means which is a laser emitting device 4 capable of generating a laser beam for reading signals.

Figure 25:
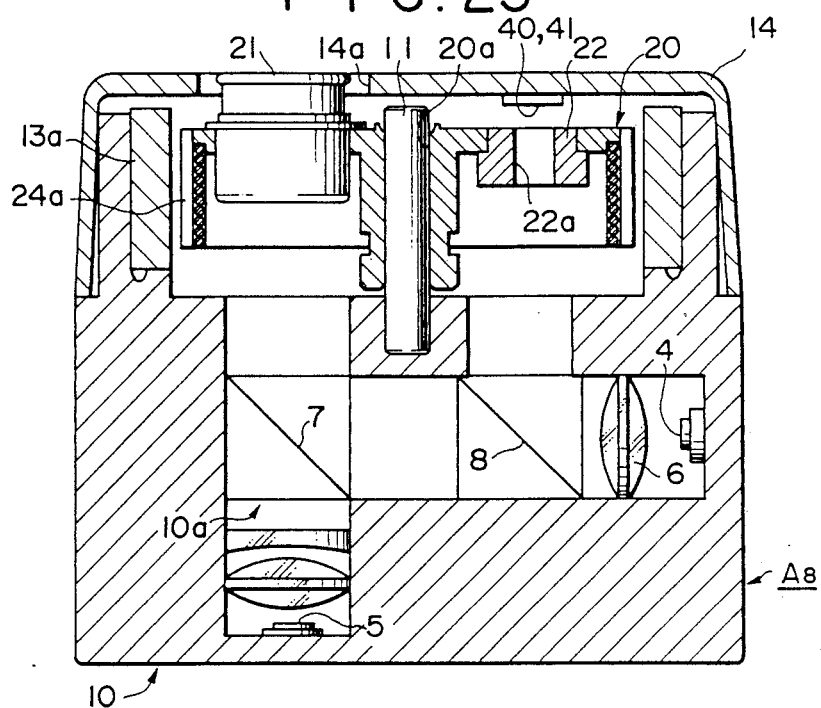
FIGS. 25 to 29 are diagrams for explaining the fifth example of the optical disk apparatus according to the present invention relating to the first aspect of this invention.

First of all, an optical pickup shown in FIG. 25 has a sight through hole 22a passing through a balancer 22 of a movable portion 20, as has already been explained with respect to the optical pickup A₇ shown in FIG. 21, and a pair of photodetectors 40 and 41 similar to those shown in FIG. 22 is arranged in parallel along the tracking driving direction of the movable portion 20 at the lower surface of the cover 14.

On the other hand, there are disposed in a hole 10a, which serves to guide light and is formed in the optical pickup body 10, a laser emitting device 4, a photodetector 5, a collimator lens 6 and half mirrors 7 and 8.

The laser beam emitted from the laser emitting device 4 is converted to a parallel luminous flux through the collimator lens 6 and then is divided into two portions (a principal beam and a sub-beam) by the half mirror 8. The principal beam irradiates an objective 21, while the sub-beam reaches the photodetectors 40 and 41 along a light path different from that of the principal beam.

The principal beam is transmitted through the half mirror 8, then is reflected towards the objective 21 by the half mirror 7 and is focused on an optical disk by the action of the objective 21.

While, the sub-beam is first reflected towards the balancer 22 by the half mirror 8 and a part thereof transmits through the sight through hole 22a and thus the photodetectors 40 and 41 are irradiated with the part of the sub-beam.

A pair of photodetectors 40 and 41 is uniformly irradiated with the sub-beam when the movable portion 20 is held at its neutral position and the photodetectors 40,41 are arranged so that the amount of light received by one device is increased, while that received by the other device is decreased, when the movable portion 20 causes displacement in the tracking direction.

Then, the signals outputted from the photodetectors 40 and 41 can be processed in a subtracter to obtain a position signal Sp which represents the displacement of the movable portion 20 in the tracking direction t.

In addition, the relative position of the sub-beam and the photodetectors 40 and 41 is not changed and as a result, when the range irradiated with light, i.e., when the sub-beam is larger than the area of the photodetectors 40 and 41, difference between the amounts of light received by the photodetectors 40 and 41 even when the movable portion 20 causes displacement is not observed.

In such a case, a rod for intercepting light is installed over the sight through hole 22a along the diameter thereof so as to be perpendicular to the tracking direciton t. Under such condition, when the movable portion is maintained at its neutral position, a shadow of the rod for intercepting light is formed on the photodetectors 40 and 41 along the boundary thereof and this shadow is moved in proportion to the displacement of the movable portion 20. Accordingly, it becomes possible to relatively change the amount of light received by each of the photodetectors 40 and 41.

Figure 26:
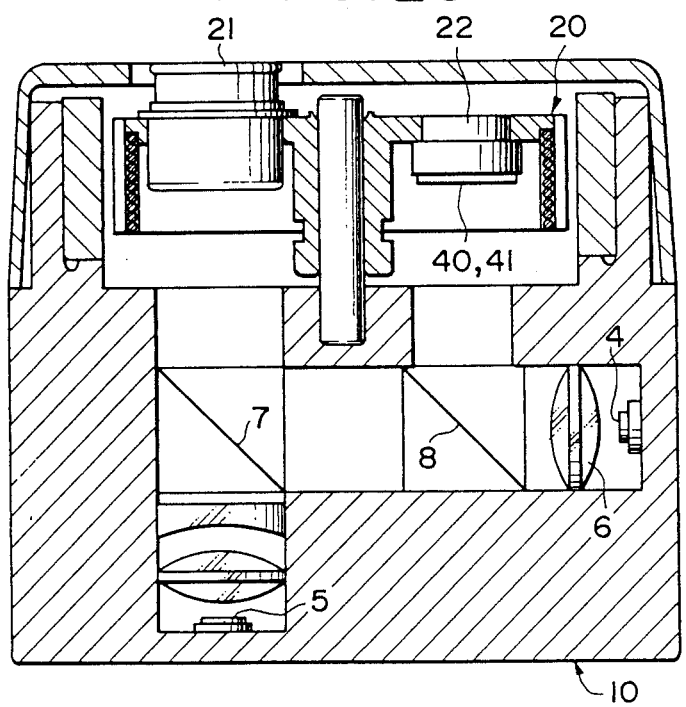

A variation of the optical pickup $A_8$ shown in FIG. 25 is illustrated in FIG. 26, in which a pair of photodetectors 40 and 41, similar to those described in FIG. 22, is disposed on the lower surface of a balancer 22 and is arranged in parallel along the tracking driving direction of a movable portion 20.

A sub-beam reflected by a half mirror 8 towards the balancer 22 directly irradiates the paired photodetectors 40 and 41. As in the foregoing example, a position signal Sp is obtained by carrying out subtraction between the signals outputted by the photodetectors 40 and 41.

Figure 43:
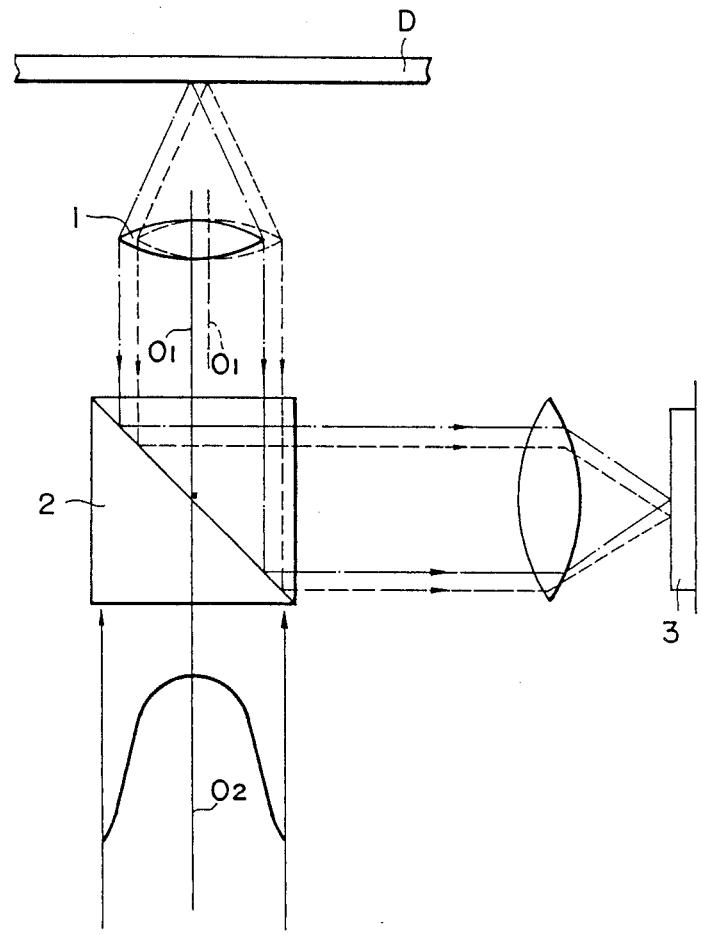
FIG. 43 is a schematic diagram of an optical system, explaining the detection of tracking errors by means of the push-pull system.
Figure 47:
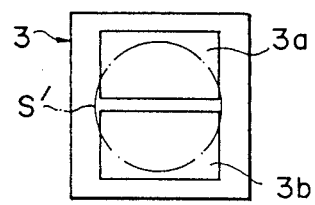
FIGS. 47 and 48 are schematic diagrams of diffraction images formed on the photodetectors.

Since the laser beam has an intensity distribution similar to that shown in FIG. 43, the difference between the amounts of light received by the photodetectors 40 and 41 accompanied by the displacement of the movable portion 20 can be detected even in the case where the range irradiated with the sub-beam is larger than the area of the photodetectors 40 and 41.

Figure 27:
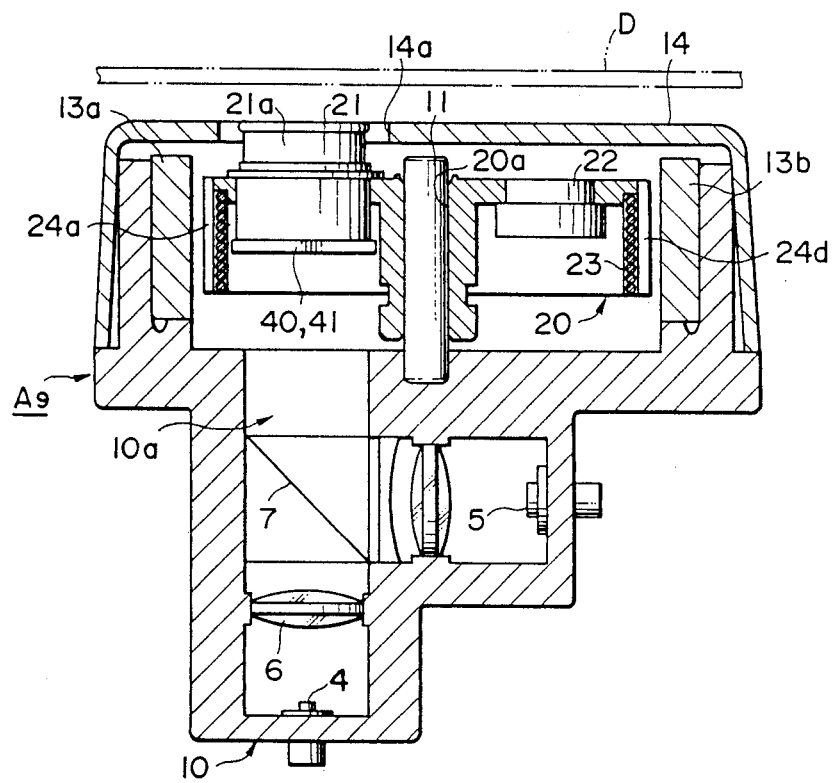

In FIG. 27, an optical pickup is shown, which is very similar to the optical pickup $A_1$ depicted in FIG. 1.

Figure 28:
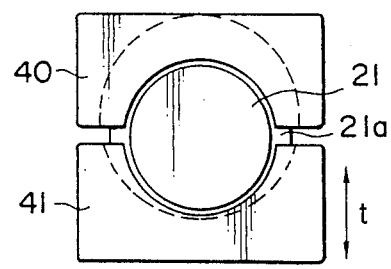

In this example, a pair of photodetectors 40 and 41, as shown enlarged in FIG. 28, is disposed at a position facing a hole 10a for transmitting light passing through an objective-supporting frame 21a which supports an objective 21 and these photodetectors are arranged in parallel along the tracking driving direction t of a movable portion 20.

The sides of these photodetectors which are opposite to each other are cut out in a half circle-like form. When they are mounted on the objective-supporting frame 21a, they have a periphery of an approximately square form as a whole and at the same time they form a circular opening of a diameter approximately equal to that of the objective 21 at their center.

The laser beam emitted by a laser emitting device 4 is converted to a parallel luminuous flux by the action of a collimator lens 6 and then is reflected by a half mirror 7 towards the objective 21.

At this time, the beam reflected towards the objective 21 has a large diameter so that the objective 21 is correctly irradiated with the beam even when the movable portion is driven in the tracking direction t.

Thus, most of the beam is focused on an optical disk through the objective 21, while the periphery of the beam beside the objective 21 reaches or irradiates the photodetectors 40 and 41.

As in the foregoing example, a positon signal Sp is obtained by carrying out subtraction between the signals outputted by the photodetectors 40 and 41.

In FIG. 28 (broken line), the range irradiated with the laser beam is schematically illustrated when the movable portion 20 is displaced to some extent in the tracking direction.

Figure 29:
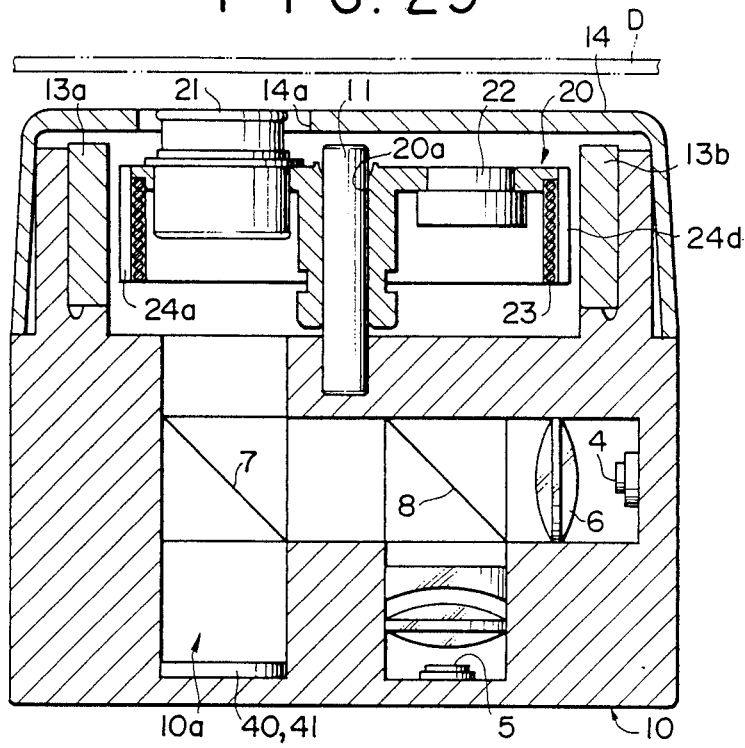

Furthermore, another variation is illustrated in FIG. 29.

In this variation, there are disposed, in a hole 10a which serves to guide light and is formed within an optical pickup body 10, a laser emitting device 4, a photodetector 5, a collimator lens 6 and two half mirrors 7 and 8. Moreover, a pair of photodetectors 40 and 41, similar to those set forth in FIG. 22, is disposed just below the half mirror 7 and the photodetectors are arranged in parallel along the moving direction of a reflected beam associated with the displacement of the movable portion 20 in the tracking direction.

The laser beam emitted by the laser emitting element 4 is focused on an optical disk D through the objective 21, then is reflected by the optical disk D towards the half mirror 7 and is divided into two parts by the action of the half mirror 7. One part is transmitted through the half mirror 7 and reaches the photodetectors 40 and 41, while the other part is reflected by the mirror 7 towards the half mirror 8.

The photodetectors, 40 and 41 are irradiated with the laser beam which is transmitted through the half mirror 7 as explained above. At this stage, these photodetectors 40 and 41 are uniformly irradiated with the laser beam reflected by the optical disk when the movable portion 20 is held at its neutral position, while in the case where the movable portion 20 is displaced in the tracking direction, the amount of light received by one device increases, and that received by the other device decreases.

Accordingly, a position signal Sp can be obtained by effecting subtraction operation between the signals outputted by the photodetectors 40 and 41.

(SIXTH EXAMPLE)

Figure 30:
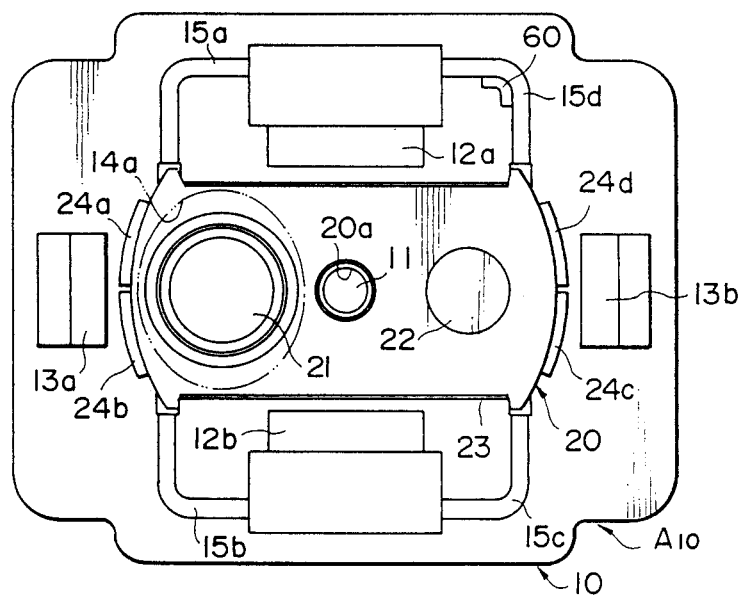
FIGS. 30 and 31 are diagrams for explaining the sixth example of the optical disk apparatus according to the present invention relating to the first aspect of this invention.

In FIG. 30, there is shown the sixth example of an optical pickup $A_{10}$ to be incorporated into the optical disk apparatus relating to the first aspect of this invention.

A movable portion 20 is mounted to an optical pickup body 10 by fitting it to a guide shaft 11 through a shaft hole 20a, as mentioned above, and the movable portion 20 is further elastically supported by four suspenders 15a, 15b, 15c and 15d which are installed between the movable portion 20 and the optical pickup body 10.

In this optical pickup $A_{10}$, a strain gauge 60 is bonded to the inner side of the crook portion of the suspender 15d. The strain gauge 60 causes deformation dependent upon the degree of deformation of the suspender 15d accompanied by the displacement of the movable portion 20 and converts the deformation of shape to a change in resistance.

Figure 31:
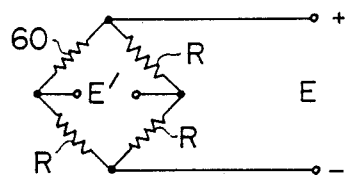

Therefore, if the strain gauge is incorporated into a Wheatstone bridge circuit such as that shown in FIG. 31 and a constant voltage E is applied thereto, the change in shape of the suspender 15d can be detected as a change in the output voltage E', whereby a position signal Sp can be obtained which represents the magnitude of displacement of the movable portion 20 in the tracking direction t.

As a variation of the aforementioned example, a strain gauge may be bonded to the inner sides of the two suspenders 15c and 15d which are symmetrical with each other with respect to the movable portion 20 situated therebetween. In such case, when the movable portion 20 is driven in the tracking direction t, the direction of a force acting on the suspender 15c is just opposite to that of a force acting on the suspender 15d and as a result one of the strain gauges, each disposed on the suspender 15c or 15d, is compressed while the other strain gauge is expanded and vice versa.

When two strain gauges are thus utilized, the change in output voltage due to the displacement of the movable portion 20 becomes larger than the change in the output voltage E' from the foregoing circuit shown in FIG. 31 and moreover a temperature compensation may also be carried out. Therefore, according to the optical pickup having such a construction, a stable output can be expected without any influence of the temperature change.

(SEVENTH EXAMPLE)

Figure 32:
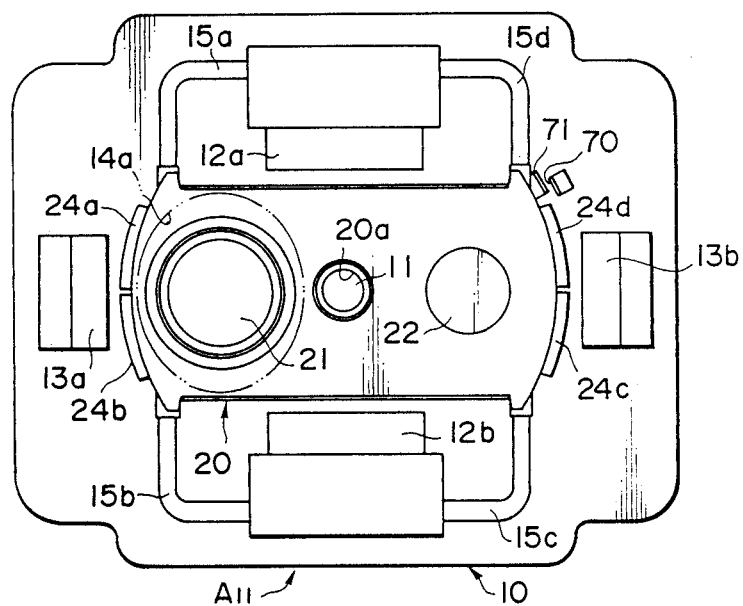
FIGS. 32 and 33 are diagrams illustrating the seventh example of the optical disk apparatus according to the present invention relating to the first aspect of this invention.

In FIG. 32, there is shown the seventh example of optical pickup $A_{11}$ which can be integrated into the optical disk apparatus according to the first aspect of this invention.

The optical pickup $A_{11}$ is equipped with a capacitor as the position sensor, and includes a pair of electrode plates 70 and 71 which can change the surface area facing to each other in proportion to the displacement of the movable portion 20 in the tracking direction.

The electrode plate 70 is placed in the vicinity of a tracking magnet 13b of the optical pickup body 10, while the electrode plate 71 is disposed adjacent to a tracking coil 24d of the movable portion 20. The electrode plate 70 has the same width as that of the electrode plate 71 in the rotational direction of the movable portion 20, while, in the focusing direction, the former has a width wider than that of the latter. They are not influenced by the displacement of the movable portion 20 in the focusing direction and change their surface area facing each other only by the displacement of the movable portion 20 towards the tracking direction.

These electrode plates 70,71 are disposed so that the surface area opposed to each other becomes approximately ½ of the maximum value thereof when the movable portion 20 is held at its neutral position Therefore, when the movable portion 20 rotates in a clockwise direction the surface areas opposed to each other increases, while if the movable portion 20 causes the rotation in the counterclockwise direction, it decreases.

The change in the surface area of the electrode plates 70 and 71 opposed to each other is expressed as the change in the electrostatic capacity of the capacitor ΔC formed by these electrode plates 70,71 and therefore, a position signal Sp representing the magnitude of displacement of the movable portion 20 can be obtained by detecting the change in electrostatic capacity of the capacitor ΔC.

Figure 33:
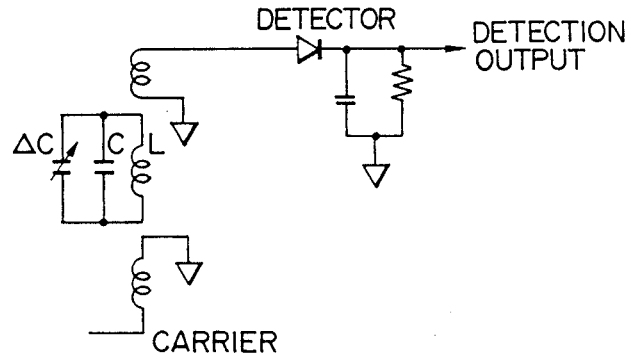

In order to detect the change in electrostatic capacity of the capacitor ΔC, a circuit shown in FIG. 33 may, for instance, be used. In this circuit, the capacitor ΔC is connected in parallel with a coil L to form a resonance circuit and for the resonance circuit, an external oscillator provides frequencies adapted to its resonance characteristics. The change in electrostatic capacity of the capacitor ΔC is changed to a change in resonance characteristic which causes the amplitude modulation of the carrier from the oscillator. Thus, the change in electrostatic capacity of the capacitor ΔC may be detected as a change in detection output by subjecting the carrier modulated in its amplitude to a peak value detection through a detector.

A variation of the foregoing example may comprise two pairs of electrode plates to form two capacitors in which the opposed surface area of the one capacitor is inversely proportional to that of the other capacitor accompanied by the displacement of the movable portion 20 in the tracking direction.

According to the optical pickup having such a construction, the electrostatic capacitance of the one capacitor increases while that of the other capacitor decreases when the movable portion 20 is displaced in the tracking direciton and vice versa.

Accordingly, the positon signal Sp which represents the magnitude of displacement of the movable portion 20 in the tracking direction can be obtained by detecting the change in the electrostatic capacitances of these two capacitors using a circuit as is shown in FIG. 33 and then effecting subtraction therebetween and in this case the position signal may have a sign plus or minus provided that the output at the neutral position is set at zero.

(EIGHTH EXAMPLE)

Figure 34:
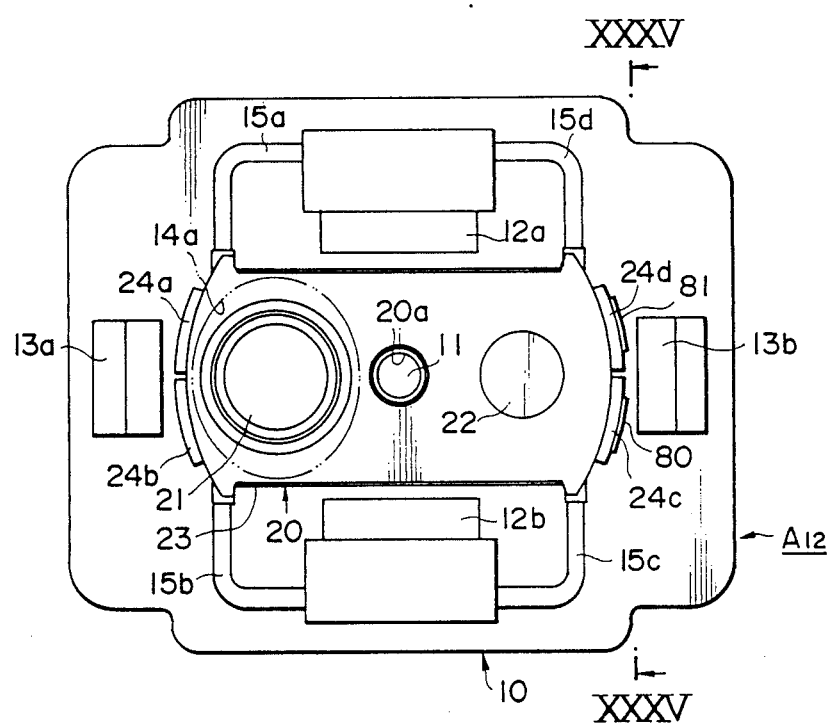
FIGS. 34 and 35 are diagrams for explaining the details of the optical disk apparatus according to the present invention related to the eighth example of the first aspect of this invention.
Figure 35:
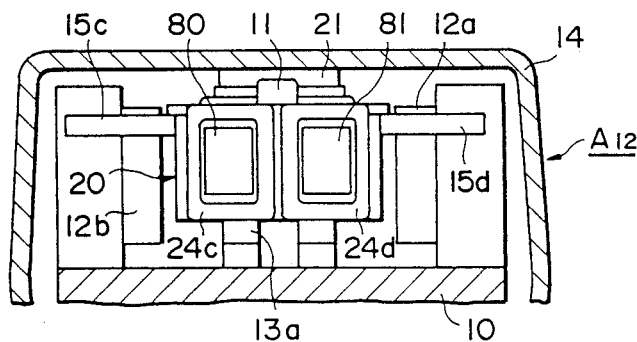

In FIG. 34 and FIG. 35 (which is a sectional view taken along the line XXXV—XXXV of FIG. 34), there is shown the eighth example of optical pickup $A_{12}$ which can be incorporated in the optical disk apparatus according to the first aspect of this invention.

On this optical pickup $A_{12}$, a pair of electromagnetic transducer devices is disposed on a movable portion 20. One of them is displaced in a magnetic field, established by a tracking magnet 13b mounted to the optical pickup body 10, in the direction along which the strength of the magnetic field gradually increases while the other of the electromagnetic transducer devices is displaced in the opposite direction along which the strength of the magnetic field gradually decreases.

In addition, the electromagnetic transducer device as used in this example are Hall elements 80 and 81 having a square planar shape.

Each of the Hall elements 80 and 81 is disposed on the tracking coil 24c or 24d of the movable portion 20 at its central position and faces to each end of the tracking magnet 13b and the strength of the magnetic field applied thereto is changed in accordance with the displacement of the movable portion 20 in the tracking direction. The Hall element 80 or 81 generates a potential difference between the output terminals if a magnetic field is applied thereto along the normal line when the element is being electrified and the potential difference is proportional to the strength of the magnetic field applied.

Unless there are other factors which exert influence on the output of the Hall element 80 or 81, the displacement of the movable portion 20 in the tracking direction can be obtained by detecting the potential difference.

However, the movable portion 20 is provided with a focusing coil 23, tracking coils 24c and 24d, or the like, and these elements also generate magnetic field when an electric current is applied thereto. Therefore, these generated magnetic fields exert influence on the output of the Hall element 80 or 81. Moreover, a temperature change during operation may be a factor which causes the change in the outputs of the Hall elements 80 and 81.

Such being the case, the optical pickup $A_{12}$ of the present invention is designed so that both Hall elements 80 and 81 are equally influenced by the factors other than the magnetic field generated by the tracking magnet 13b. Therefore, if the difference between the outputs of both elements is calculated, only the information concerning the magnetic field generated by the tracking magnet 13b can be obtained and thereby a position signal Sp which represents the displacement of the movable portion 20 in the tracking direction can be produced.

Moreover, in the optical pickup of the example, only the construction, in which the Hall elements 80 and are disposed on the tracking coils 24c and 24d respectively, is depicted or explained, however, the invention is not restricted to such specific construction. For instance, the same effect as set forth in the above example can be expected by disposing the Hall elements on the tracking coils 24a and 24b, the tracking coil 24a and 24d or the tracking coils 24b and 24c.

(EXAMPLE RELATING TO THE SECOND ASPECT OF THE INVENTION)

FIGS. 36 to 39 are diagrams showing preferred examples of the optical disk apparatus according to the second aspect of the present invention, which will be explained below.

In the following examples, only the servo tracking circuit which can be incorporated in the optical disk apparatus of this invention is depicted in the figures and the optical pickup driven by the servo tracking circuit is omitted. The optical pickup as used in the following examples is a known one which comprises an optical pickup body provided with a photodetector which receives the laser beam reflected by an optical disk; a movable portion supported by the optical pickup body in a condition freely movable with respect to the optical pickup body and which supports an objective for focusing the laser beam on the optical disk; and an actuator for driving the movable portion or causing displacement of the portion in the tracking direction, and which approximately, corresponds to the optical pickups depicted in the foregoing figures for explaining the examples relating to the first aspect of this invention, from which the position sensor is removed.

Figure 36:
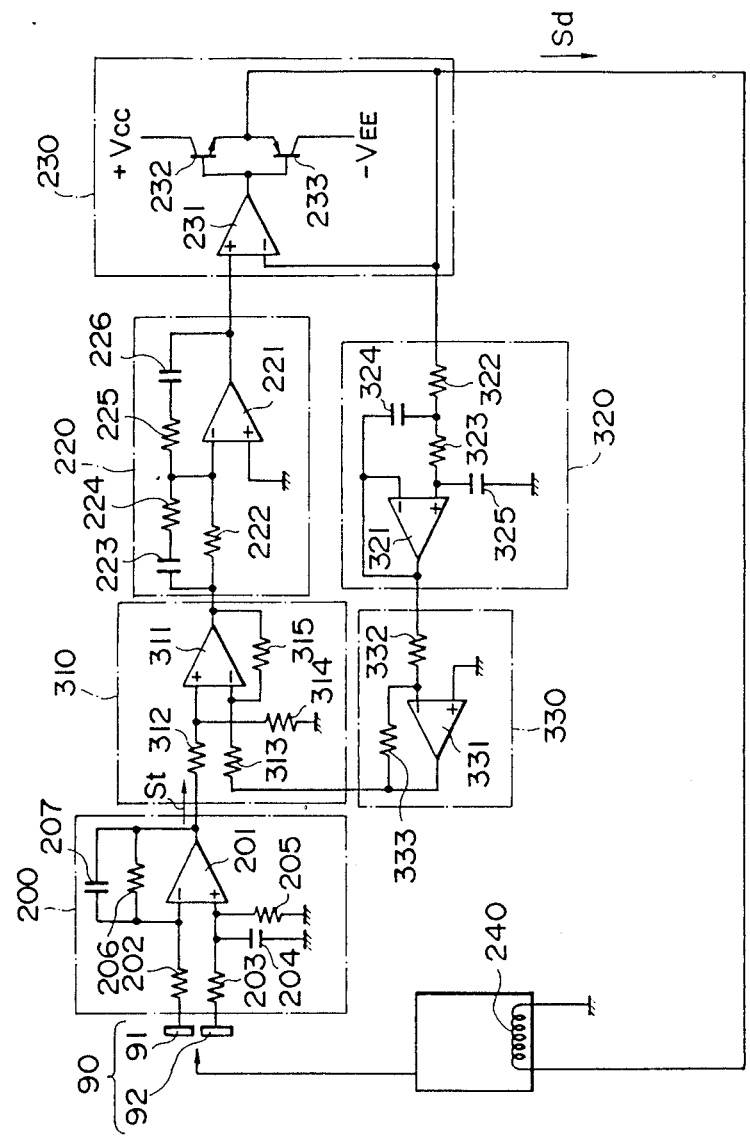

FIG. 36 is a diagram illustrating the first example of a servo tracking circuit which is mounted with the optical disk apparatus of this invention, the servo tracking circuit being a constant voltage driving type.

In FIG. 36, the reference numeral 90 denotes a photodetector which receives the laser beam reflected by the optical disk and has light receiving portions 91 and 92.

The output signal of the photodetector 90 is inputted to a subtracter 200 in which a tracking error signal St is produced according to the push-pull system. The subtracter 200 comprises an Op Amp 201, to the negative terminal of which the light receiving portion 91 is connected through a resistor 202, and to the positive terminal of which the light receiving portion 92 is connected through a resistor 203. Furthermore, a capacitor 204 and a resistor 205, each having one of the ends thereof being grounded, are connected to the positive terminal of the Op Amp 201, and a resistor 206 and a capacitor 207 are connected, in parallel, on the one hand, to the negative terminal of the Op Amp 201 and, on the other hand, to the output terminal thereof.

The tracking error signal St is inputted to a subtracter 310 which constitutes a feedback circuit together with a low-pass filter 320 and an amplifier 330 as will be explained below. The subtracter 310 is provided with an Op Amp 311 in which the positive terminal thereof is connected to the output terminal of the subtracter 200 through a resistor 312, while the negative terminal thereof is connected to the output terminal of the amplifier 330 through a resistor 313. Moreover, the positive terminal of the Op Amp 311 is connected to a resistor 314, the one end thereof being grounded, and a resistor 315 is connected, on the one hand, to the negative terminal of the Op Amp 311 and, on the other hand, to the output terminal thereof.

The subtracter 310 is connected to a phase compensating circuit 220. The phase compensating circuit 220 is provided with an Op Amp 221 in which the negative terminal thereof is connected to the output terminal of the subtracter 310 through a resistor 222 and the positive terminal thereof is grounded. In addition, a series circuit comprised of a capacitor 223 and a resistor 224 is connected to the resistor 222 in parallel therewith and a series circuit consisting of a resistor 225 and a capacitor 226 is connected on the one hand to the negative terminal of the Op Amp 221 and on the other hand to the output terminal thereof.

The phase compensating circuit 220 is connected to a driving circuit 230 which outputs a driving signal Sd to the actuator for driving the movable portion of the optical pickup in the tracking direction. The driving circuit 230 is comprised of an Op Amp 231, an NPN type transistor 232 and a PNP type transistor 233. The positive terminal of the Op Amp 231 is connected to the output terminal of the phase compensating circuit 220, and the output terminal of the Op Amp 231 is connected to each base of the transistors 232 and 233. Moreover, the collector of the NPN type transistor 232 is connected to the positive terminal of the power source $+V_{cc}$, while the collector of the PNP type transistor 233 is connected to the negative terminal of the power source $-V_{EE}$. The emitter of each transistor 232 or 233 is connected to a tracking coil 240 which constitutes the actuator for driving the movable portions of the optical pickup in the tracking direction, the negative terminal of the Op Amp 231 and the low-pass filter 320.

The low-pass filter 320 comprises an Op Amp 321, resistors 322 and 323 and capacitors 324 and 325 and the positive terminal of the Op Amp 321 is connected to the output terminal of the driving circuit 230 through the resistors 322 and 323, while the negative terminal of the Op Amp 321 is connected to the output terminal thereof. In addition, the capacitor 324 is connected, on the one hand, to the resistors 322 and 323 and, on the other hand, to the negative terminal of the Op Amp 321, while the capacitor 325 is connected, on the one hand, to the positive terminal of the Op Amp 321 while the other end thereof is grounded.

The low-pass filter 320 is connected to the subtracter 310 through an amplifier 330. The amplifier 330 has an Op Amp 331, the negative terminal of which is connected to the output terminal of the Op Amp 321 through a resistor 332 and the positive terminal of which is grounded. Moreover, the negative terminal of the Op Amp 331 and the output terminal thereof are connected to a resistor 333.

The movable portion of the optical pickup supporting an objective causes the follow-up displacement in accordance with a displacement frequency characteristic illustrated in FIG. 37, which shows the magnitude of displacement of the objective with reference to the frequency of the driving signal Sd for the movable portion, when an electric current is applied to the tracking coil 240.

At this stage, the tracking error signal St outputted from the subtracter 200 includes the direct-current offset resulting from the displacement of the movable portion, as already mentioned above. Then, the servo tracking circuit is designed such that this direct-current offset is removed from the tracking error signal St by means of the feedback circuit which consists of the low-pass filter 320, the amplifier 330 and the subtracter 310.

The low-pass filter 320 has a gain frequency characteristic corresponding to the displacement frequency characteristic of the objective, as seen from FIG. 38. The driving signal Sd from the driving circuit 230 is fed back to the low-pass filter 320. The low-pass filter 320 serves to obtain a corresponding displacement voltage which corresponds to the magnitude of displacement of the objective displaced on the basis of the driving signal Sd in accordance with the frequency thereof and the corresponding voltage displacement is inputted to the subtracter 310 through the amplifier 330.

The subtracter 310 serves to eliminate the direct-current offset included in the tracking error signal St. The amplitude (or voltage) of the direct-current offset is in general proportional to the magnitude of the displacement which the objective undergoes and the magnitude of displacement which the objective undergoes is determined by the driving signal Sd. Thus, if it is designed to obtain the corresponding displacement voltage on the basis of the driving signal Sd, the resulting corresponding displacement voltage has a one-to-one correspondence with the magnitude of displacement undergone by the objective. Therefore, the direct-current offset included in the tracking error signal St may surely be removed by properly amplifying the resultant corresponding displacement voltage by means of the amplifier 330.

In FIGS. 37 and 38, fo denotes the resonance frequency and the magnitude of displacement which the objective undergoes and the gain is attenuated at a rate of 12 dB/octave within the frequency range of higher than the resonance frequency.

A variation of the foregoing example is shown in FIG. 39, in which the servo tracking circuit is a constant current type.

This example is similar to that set forth in FIG. 36 except that a feedback circuit is designed so that the voltage of a resistor 250 which constitutes part of a current-feedback circuit is fed back, as the driving signal, to a low-pass filter 320. Therefore, a detailed explanation is omitted since that in FIG. 39 and FIG. 36, like reference numerals designate like elements.

We claim:

1. An optical pickup for a planar optical disk having a plurality of tracks, said optical pickup comprising:
   (a) an optical pickup body provided with a laser for producing laser light;
   (b) a movable portion mounted on said optical pickup body for movement relative thereto in a tracking direction essentially perpendicular to a track and for rotation about an axis perpendicular to the plane of the disk;
   (c) an optical system, including an objective mounted on said movable portion, for focusing laser light into a spot of said disk;
   (d) a photodetector cooperable with said optical system for receiving laser light reflected from said disk and producing tracking error signals;
   (e) a position sensor for producing position signals that establish the position of said movable portion relative to said body;
   (f) a servo tracking circuit responsive to said position signals and said tracking error signals for producing a driving signal;
   (g) actuator means for moving said movable portion on said optical pickup to thereby displace said objective in a tracking direction in response to said driving signal;
   (h) said position sensor including a light source, and light receiving means for receiving light from said source, said position sensor being constructed and arranged so that said light receiving means produces said position signals; and
   (i) said light receiving means including at least two photosensitive receivers displaced from each other in the tracking direction, said light source being different from said laser, said movable portion including a planar plate having a surface parallel to the plane of said disk, said receivers being mounted on said plate, and said light source being mounted on said optical pickup body.

2. An optical pickup for a planar optical disk having a plurality of tracks, said optical pickup comprising:
   (a) an optical pickup body provided with a laser for producing laser light;
   (b) a movable portion mounted on said optical pickup body for movement relative thereto in a tracking direction essentially perpendicular to a track and for rotation about an axis perpendicular to the plane of the disk;
   (c) an optical system, including an objective mounted on said movable portions, for focusing laser light into a spot on said disk;
   (d) a photodetector cooperable with said optical system for receiving laser light reflected from said disk and producing tracking error signals;
   (e) a position sensor for producing position signals that establish the position of said movable portion relative to said body;
   (f) a servo tracking circuit responsive to said position signals and said tracking error signals for producing a driving signal;
   (g) actuator means for moving said movable portion on said optical pickup to thereby displace said objective in a tracking direction in response to said driving signal;
   (h) said position sensor including a light source, and light receiving means for receiving light from said source, said position sensor being constructed and arranged so that said light receiving means produces said position signals; and
   (i) said light receiving means including at least two photosensitive receivers displaced from each other in the tracking direction, said light source being different from said laser, said movable portion including a planar plate having a surface parallel to the plane of said disk, and also including a central boss rigidly connected to said plate, and said receivers are mounted on said boss, said light source being mounted on said optical pickup body.

3. An optical pickup for a planar optical disk having a plurality of tracks, said optical pickup comprising:
   (a) an optical pickup body provided with a laser for producing laser light;
   (b) a movable portion mounted on said optical pickup body for movement relative thereto in a tracking direction essentially perpendicular to a track, said movable portion being provided with a mirror having a pair of inclined surfaces;
   (c) an optical system, including an objective mounted on said movable portion, for focusing laser light into a spot of said disk;
   (d) a photodetector cooperable with said optical system for receiving laser light reflected from said disk and producing tracking error signals;
   (e) a position sensor for producing position signals that establish the position of said movable portion relative to said body;

(f) a servo tracking circuit responsive to said position signals and said tracking error signals for producing a driving signal;

(g) actuator means for moving said movable portion on said optical pickup to thereby displace said objective in a tracking direction in response to said driving signal;

(h) said position sensor including a light source, and light receiving means for receiving light from said source, said position sensor being constructed and arranged so that said light receiving means produces said position signals; and (i) said light receiving means including at least two photosensitive receivers displaced from each other in the tracking direction, said light source being different from said laser, said receivers and said light sources being mounted on said body, and light from said source being reflected from said movable portion.

4. An optical pickup for a planar optical disk having a plurality of tracks, said optical pickup comprising:

(a) an optical pickup body provided with a laser for producing laser light;

(b) a movable portion mounted on said optical pickup body for movement relative thereto in a tracking direction essentially perpendicular to a track, said movable portion being provided with a plane mirror whose reflectivity differs in the tracking direction;

(c) an optical system, including an objective mounted on said movable portion, for focusing laser light into a spot of said disk;

(d) a photodetector cooperable with said optical system for receiving laser light reflected from said disk and producing tracking error signals;

(e) a position sensor for producing position signals that establish the position of said movable portion relative to said body;

(f) a servo tracking circuit responsive to said position signals and said tracking error signals for producing a driving signal;

(g) actuator means for moving said movable portion on said optical pickup to thereby displace said objective in a tracking direction in response to said driving signal;

(h) said position sensor including a light source, and light receiving means for receiving light from said source, said position sensor being constructed and arranged so that said light receiving means produces said position signals; and (i) said light receiving means including at least two photosensitive receivers displaced from each other in the tracking direction, and said light source being different from said laser, said receivers and said light source being mounted on said body, and light from said source being reflected from said movable portion.

5. An optical pickup for a planar optical dish having a plurality of tracks, said optical pickup comprising:

(a) an optical pickup body provided with a laser for producing laser light;

(b) a movable portion mounted on said optical pickup body for movement relative thereto in a tracking direction essentially perpendicular to a track;

(c) an optical system, including an objective mounted on said movable portion, for focusing laser light into a spot of said disk;

(d) a photodetector cooperable with said optical system for receiving laser light reflected from said disk and producing tracking error signals;

(e) a position sensor for producing position signals that establish the position of said movable portion relative to said body;

(f) a servo tracking circuit responsive to said position signals and said tracking error signals for producing a driving signal;

(g) actuator means for moving said movable portion on said optical pickup to thereby displace said objective in a tracking direction in response to said driving signal;

(h) said position sensor including a light source, and light receiving means for receiving light from said source, said position sensor being constructed and arranged so that said light receiving means produces said position signals; and (i) a mask interposed between said receiving means and said light source, said mask having a transmissivity that varies in the tracking direction.

6. An optical pickup according to claim 5 wherein said mask is in the form of a triangularly shaped aperture.

7. An optical pickup according to claim 5 wherein said mask is in the form of a plurality of separate apertures whose projected area is triangular.

8. An optical pickup according to claim 5 wherein said mask is in the form of a plurality of separate apertures of different widths which change in the tracking direction.

9. An optical pickup according to claim 5 wherein said mask is in the form of a plate whose optical density varies in the tracking direction.

10. An optical pickup for a planar optical disk having a plurality of tracks, said optical pickup comprising:

(a) an optical pickup body provided with a laser for producing laser light;

(b) a movable portion mounted on said optical pickup body for movement relative thereto in a tracking direction essentially perpendicular to a track;

(c) an optical system, including an objective mounted on said movable portion, for focusing laser light into a spot of said disk;

(d) a photodetector cooperable with said optical system for receiving laser light reflected from said disk and producing tracking error signals;

(e) a position sensor for producing position signals that establish the position of said movable portion relative to said body;

(f) a servo tracking circuit responsive to said position signals and said tracking error signals for producing a driving signal;

(g) actuator means for moving said movable portion on said optical pickup to thereby displace said objective in a tracking direction in response to said driving signal;

(h) said position sensor including a light source, and light receiving means for receiving light from said source, said position sensor being constructed and arranged so that said light receiving means produces said position signals;

(i) said light receiving means including at least two photosensitive receivers displaced from each other in the tracking direction, said light source being different from said laser; and (j) a mask interposed between said receiving means and said source for limiting illumination from said source to an area no larger than the area of the receivers when the spot from the laser light is centered on at least one track on the disk.

11. An optical pickup according to claim 10 wherein each receiver produces receiver signals, and said position sensor includes a circuit for subtracting said receivers signals to produce said position signal.

12. An optical pickup for a planar optical disk having a plurality of tracks, said optical pickup comprising:
   (a) an optical pickup body provided with a laser for producing laser light;
   (b) a movable portion mounted on said optical pickup body for movement relative thereto in a tracking direction essentially perpendicular to a track;
   (c) an optical system, including an objective mounted on said movable portion, for focusing laser light into a spot of said disk;
   (d) a photodetector cooperable with said optical system for receiving laser light reflected from said disk and producing tracking error signals;
   (e) a position sensor for producing position signals that establish the position of said movable portion relative to said body;
   (f) a servo tracking circuit responsive to said position signals and said tracking error signals for producing a driving signal;
   (g) actuator means for moving said movable portion on said optical pickup to thereby displace said objective in a tracking direction in response to said driving signal; and
   (h) said position sensor including a light source, and light receiving means for receiving light from said source, said position sensor being constructed and arranged so that said light receiving means produces said position signals, said light receiving means including at least two photosensitive receivers displaced from each other in the tracking direction, and said light source being the laser.

13. An optical pickup according to claim 12 wherein said receivers are mounted on said body, and laser light incident thereon passes through an aperture in said movable portion.

14. An optical pickup according to claim 12 wherein said receivers are mounted on said movable portion.

15. An optical pickup according to claim 14 wherein said receivers are mounted in a plane perpendicular to the axis of said objective and are provided with notches that direct the passage of laser light through said objective.

16. An optical pickup according to claim 12 wherein said receivers are mounted on said optical pickup body symmetrically about the axis of said objective.

17. An optical pickup according to claim 12 wherein said servo circuit includes:
   (a) a first subtractor for taking the difference between said position signals to produce the tracking error signal;
   (b) a second subtractor for taking the difference between a feedback signal and said tracking error signal to produce a difference signal;
   (c) a processor for processing said difference signal to form said driving signal; and
   (d) a feedback circuit responsive to said driving signal for producing said feedback signal.

18. A tracking servo circuit according to claim 17 wherein said feedback circuit includes a low-pass filter for removing any DC offset in said tracking error signals.

19. An optical pickup for a planar optical disk having a plurality of tracks, said optical pickup comprising:
   (a) an optical pickup body provided with a laser for producing laser light;
   (b) a movable portion mounted on said optical pickup body for movement relative thereto in a tracking direction essentially perpendicular to a track;
   (c) an optical system, including an objective mounted on said movable portion, for focusing laser light into a spot of said disk;
   (d) a photodetector cooperable with said optical system for receiving laser light reflected from said disk and producing tracking error signals;
   (e) a position sensor for producing position signals that establish the position of said movable portion relative to said body;
   (f) a servo tracking circuit responsive to said position signals and said tracking error signals for producing a driving signal;
   (g) actuator means for moving said movable portion on said optical pickup to thereby displace said objective in a tracking direction in response to said driving signal;
   (h) said position sensor including a light source, and light receiving means for receiving light from said source, said position sensor being constructed and arranged so that said light receiving means produces said position signals;
   (i) said light receiving means including at least two photosensitive receivers displaced from each other in the tracking direction, and said light source being different from said laser;
   (j) said servo tracking circuit including a first subtracter for producing said position signals by taking the difference between signals produced by said receivers; and
   (k) said photodetector comprising at least two separate detectors, and said servo tracking circuit including a second subtractor for producing tracking error signals by taking the difference between signals produced by said detectors, means for scaling said position signals to produce scaled position signals, a third subtracter for taking the difference between said scaled position signals and said tracking error signals for producing a difference signal, means to process said difference signal to produce a processed difference signal, and a fourth subtracter for taking the difference between said processed difference signal and position signals for producing said driving signal.

20. An optical pickup according to claim 19 including a selectively operable switch for selectively disconnecting said difference signal from said fourth subtractor.

21. An optical pickup for a planar optical disk having a plurality of tracks, said optical pickup comprising:
   (a) an optical pickup body provided with a laser for producing laser light;
   (b) a movable portion mounted on said optical pickup body for movement relative thereto in a tracking direction;
   (c) an optical system, including an objective mounted on said movable portion, for focusing laser light into a spot of said disk;
   (d) a photodetector cooperable with said optical system for receiving laser light reflected from said disk and producing reading signals;

(e) a position sensor for producing position signals that establish the position of said spot relative to a track;

(f) a servo tracking circuit responsive to said position signals for producing a driving signal;

(g) actuator means for moving said movable portion on said optical pickup to thereby displace said objective in a tracking direction in response to said driving signal;

(h) said position sensor including means for establishing a parameter functionally related to the position of the movable portion on the optical pickup body, said position sensor being responsive to said parameter for generating said position signals; and (i) said means for establishing a parameter including resilient suspension means linking said movable portion to said optical pickup body, said parameter being the strain in said suspension means, and a strain gauge associated with said suspension means for measuring the strain in said suspension means and producing position signals.

22. An optical pickup for a planar optical disk having a plurality of tracks, said optical pickup comprising:

(a) an optical pickup body provided with a laser for producing laser light;

(b) a movable portion mounted on said optical pickup body for movement relative thereto in a tracking direction;

(c) an optical system, including an objective mounted on said movable portion, for focusing laser light into a spot of said disk;

(d) a photodetector cooperable with said optical system for receiving laser light reflected from said disk and producing reading signals;

(e) a position sensor for producing position signals that establish the position of said spot relative to a track;

(f) a servo tracking circuit responsive to said position signals for producing a driving signal;

(g) actuator means for moving said movable portion on said optical pickup to thereby displace said objective in a tracking direction in response to said driving signal; and (h) said position sensor including means for establishing a parameter functionally related to the position of the movable portion on the optical pickup body, and means responsive to said parameter for generating said position signals, said means for establishing a parameter includes opposed Hall effect elements mounted on said movable portion facing permanent magnets mounted on said optical pickup body, said parameter being the Hall voltage generated by said Hall effect elements, and a Hall effect generator responsive to said Hall elements for producing Hall voltages constituting said position signals.

* * * * *

UNITED STATES PATENT AND TRADEMARK OFFICE
CERTIFICATE OF CORRECTION

PATENT NO. : 4,956,833

DATED : September 11, 1990

INVENTOR(S) : H. KOKADO et al.

Page 1 of 2

It is certified that error appears in the above-indentified patent and that said Letters Patent is hereby corrected as shown below:

On the cover page, at line 9, right hand column, change "Ando369" to ---Ando...369/44---.

At column 1, line 33, change "pregrooves" to ---pregroove---.

At column 1, line 66, delete "," after ---position---.

At column 2, line 10, change "shot" to ---short---.

At column 5, line 20, change "gage" to ---gauge---.

At column 5, line 23, change "gage" to ---gauge---.

At column 6, line 29, change "positon" to ---position---.

At column 9, line 5, delete "to" after "facing".

At column 9, line 52, change "therefor" to ---,therefore,---.

At column 9, line 54, change "therefor" to ---,therefore,---.

UNITED STATES PATENT AND TRADEMARK OFFICE
CERTIFICATE OF CORRECTION

PATENT NO. : 4,956,833
DATED : September 11, 1990
INVENTOR(S) : H. KOKADO et al.

It is certified that error appears in the above-indentified patent and that said Letters Patent is hereby corrected as shown below:

```
At column 11, line 3, delete "," after ---pickup---.
At column 14, line 15, delete "," after "controlling".
At column 17, line 53, change "positon" to ---position---

At  column  19,  line  68,  change  "direciton"  to  ---direction---.
At column 20, line 1, change "positon" to ---position---.
At column 20, line 32, delete "to" after "faces".
At column 20, line 48, change "field" to ---fields---.
```

Signed and Sealed this

Twenty-third Day of November, 1993

Attest:

BRUCE LEHMAN

*Attesting Officer*     *Commissioner of Patents and Trademarks*